(12) United States Patent
Segawa et al.

(10) Patent No.: US 6,463,835 B1
(45) Date of Patent: Oct. 15, 2002

(54) METHOD AND APPARATUS FOR CONTROLLING MOTOR-DRIVEN CHUCKING DEVICE

(75) Inventors: Yasunori Segawa; Toru Ogawa, both of Ibaraki (JP)

(73) Assignee: Hitachi Seiki Co., Ltd., Abiko (JP)

( * ) Notice: Subject to any disclaimer, the term of this patent is extended or adjusted under 35 U.S.C. 154(b) by 0 days.

(21) Appl. No.: 09/422,246

(22) Filed: Oct. 21, 1999

(30) Foreign Application Priority Data

Oct. 23, 1998 (JP) .......................................... 10-301901
Aug. 24, 1999 (JP) .......................................... 11-237555

(51) Int. Cl.⁷ .............................. B23B 1/00; B23B 7/00
(52) U.S. Cl. .............................. 82/1.11; 82/47; 82/118; 279/4.02
(58) Field of Search ........................... 82/165, 168, 118, 82/1.11, 47; 279/4.02, 126, 114; 700/151, 145, 160, 170

(56) References Cited

U.S. PATENT DOCUMENTS

| | | | | |
|---|---|---|---|---|
| 3,499,657 A | * | 3/1970 | Giraud et al. | 279/114 |
| 3,698,729 A | * | 10/1972 | Scharfen et al. | 279/4.02 |
| 4,414,871 A | * | 11/1983 | Trout | 82/165 |
| 4,443,021 A | * | 4/1984 | Buchholz et al. | 279/4.02 |
| 4,600,357 A | * | 7/1986 | Coules | 318/685 |
| 4,726,729 A | * | 2/1988 | Olson et al. | 294/119.1 |
| 4,781,390 A | * | 11/1988 | Steinberger et al. | 279/4.02 |
| 4,791,588 A | * | 12/1988 | Onda et al. | 700/260 |
| 4,815,000 A | * | 3/1989 | Yoneda et al. | 364/474 |
| 5,135,242 A | * | 8/1992 | Toth | 279/4.02 |
| 5,413,611 A | * | 5/1995 | Haslam, II et al. | 623/25 |

FOREIGN PATENT DOCUMENTS

| | | | | |
|---|---|---|---|---|
| DE | 003023413 | * | 1/1982 | 279/4.02 |
| JP | 404289006 | * | 10/1992 | 279/4.02 |
| JP | 404289007 | * | 10/1992 | 279/4.02 |
| SU | 001567329 | * | 5/1990 | 279/4.02 |

\* cited by examiner

Primary Examiner—Henry Tsai
(74) Attorney, Agent, or Firm—Armstrong, Westerman & Hattori, LLP

(57) ABSTRACT

A method and apparatus for controlling a motor-driven chucking device which are capable of delicately controlling the workpiece gripping force, the travel speed of gripping jaws, and so forth. The method controls a motor-driven chucking device in which gripping jaws of a chuck provided on a main spindle rotatably supported by a headstock of a machine tool are opened or closed by a torque controllable driving motor to grip a workpiece. The method includes the steps of inputting a set value for gripping force with which the gripping jaws grip the workpiece, and opening or closing the gripping jaws by controlling rotation of the driving motor according to the set value for the gripping force.

20 Claims, 12 Drawing Sheets

Fig. 3

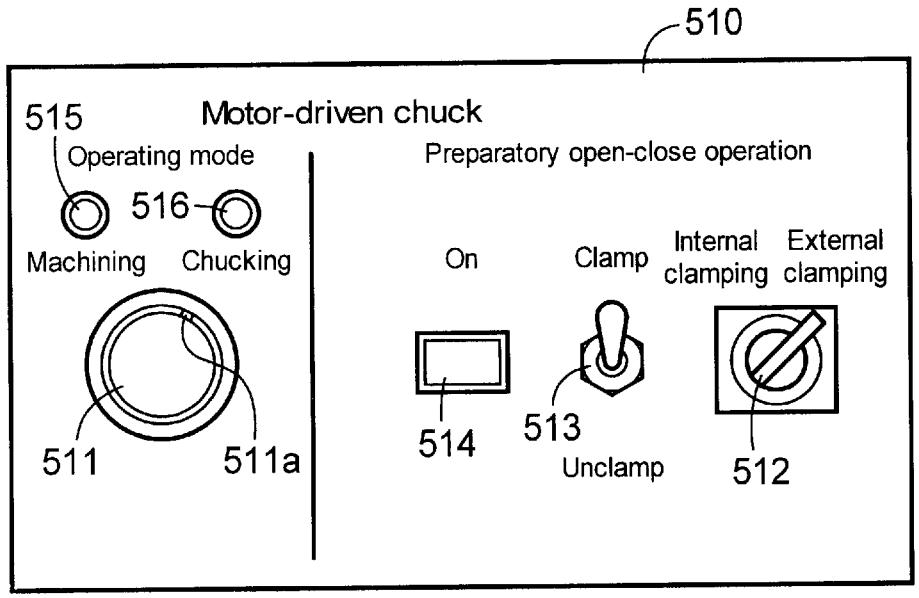

Fig. 4

Chuck maintenance

Hardware basic parameters

☐ Maximum input torque      oo. o   kgf·m
☐ Maximum gripping force    ooooo   kgf
☐ Minimum gripping force    ooooo   kgf
☐ Gripping force setting unit  oooo  kgf
☐ In-chuck reduction ratio  o. ooo
☐ Scroll pitch              oo. o   mm
☐ Internal clutch tooth pitch  o. o  deg Software basic parameters ☐ Stroke upper limit         oo. o   mm
☐ Stroke lower limit         oo. o   mm
☐ Torque limiting value T1   ooo    %
☐ Torque limiting value T3   ooo    %
■ C-axis command speed V1    ooo    $\text{min}^{-1}$
☐ C-axis command speed V2    ooo    $\text{min}^{-1}$
☐ C-axis command speed V3    ooo    $\text{min}^{-1}$

| Setting | Calibration | | | | | | | |
|---|---|---|---|---|---|---|---|---|

Fig.12(a)

| G10 L130 Pnn; | nn: CHUCKING DATA FILE No. (PARAMETER GROUP No.) |

Fig.12(b)

| 02000 (WORK A); | PROGRAM FOR WORKPIECE A |
| G10 L130 P10; | PARAMETER GROUP No. 10 IS SELECTED |
| M68; | CHUCK CLAMP (GRIP) MACHINING PROGRAM |
| M69; | CHUCK UNCLAMP (RELEASE) |
| M30; | PROGRAM TERMINATES |
| 02200 (WORK B); | PROGRAM FOR WORKPIECE B |
| G10 L130 P12; | PARAMETER GROUP No. 12 IS SELECTED |
| M68; | MACHINING PROGRAM |
| M69; | |
| M30; | PROGRAM TERMINATES |

Fig.12(c)

PARAMETER GROUP No. 10
NC PROGRAM No.
GRIPPING FORCE          5000 kgf
GRIPPING DIAMETER       100.0 mm
SPEED CHANGE POINT      101.0 mm
RETRACTION POINT        110.0 mm
MANDREL DIAMETER
ERROR DETECTION LEVEL   ±3.0 %

Fig.12(d)

PARAMETER GROUP No. 12
NC PROGRAM No.
GRIPPING FORCE          1000 kgf
GRIPPING DIAMETER       82.0 mm
SPEED CHANGE POINT      83.0 mm
RETRACTION POINT        92.0 mm
MANDREL DIAMETER
ERROR DETECTION LEVEL   ±1.0 %

Fig.13(a)

| G10  L131  Pnn  Qmm  Rdd; | nn: FILE No.<br>mm: DATA No.<br>dd: DATA |
|---|---|

| DATA No.<br>(mm) | DATA ITEMS |
|---|---|
| 1 | GRIPPING FORCE |
| 2 | GRIPPING DIAMETER |
| 3 | SPEED CHANGE POINT |
| 4 | RETRACTION POINT |
| 5 | ERROR DETECTION LEVEL |

METHOD AND APPARATUS FOR CONTROLLING MOTOR-DRIVEN CHUCKING DEVICE

BACKGROUND OF THE INVENTION

1. Field of the Invention

The present invention relates to a method and apparatus for controlling a motor-driven chucking device in which a chuck of a machine tool is driven to open or close by a driving motor. More particularly, the present invention relates to a method and apparatus for controlling a motor-driven chucking device in which a chuck is driven to open or close by a spindle motor for driving a main spindle.

2. Description of the Related Art

A chuck for grasping a workpiece is mounted on the spindle nose of a machine tool, such as a lathe. There is a publicly known chucking device in which the open-close operation of the gripping jaws of the chuck is carried out by a hydraulic cylinder. However, the chucking device using a hydraulic cylinder to drive the gripping jaws has an unfavorably short open-close stroke of the gripping jaws and therefore needs to adjust the position of the gripping jaws or to change them in order to grip workpieces much different in diameter from those which are expected to be held by the gripping jaws. The position adjustment or the change of the gripping jaws requires a problematic operation and causes the operating efficiency and the availability factor of the machine tool to reduce unfavorably.

There has heretofore been another type of chucking device in which gripping jaws are driven to open or close by a servo-motor as disclosed in Japanese Utility Model Application Post-Exam Publication No. 63-38968 (1988). In this chucking device, the position of the gripping jaws is detected indirectly with a sensor, and the open position of the gripping jaws at the time of initiating gripping or ungripping is controlled to an appropriate position according to the size of workpieces.

In the conventional chucking device in which the gripping jaws are driven to open or close by a servo-motor, the open position of the gripping jaws can be controlled, but the workpiece gripping force cannot be controlled. It is also impossible for the conventional chucking device to effect delicate control by combining together the closing side position (gripping position) of the gripping jaws and the driving torque of the servo-motor, or control such that travel speeds of the gripping jaws are changed from one to another according to the position of the gripping jaws.

SUMMARY OF THE INVENTION

Under these circumstances, an object of the present invention is to provide a method and apparatus for controlling a motor-driven chucking device in which a chuck of a machine tool is driven to open or close by a driving motor, which are capable of delicately controlling the workpiece gripping force, the travel speed of the gripping jaws, and so forth.

To attain the above-described object, the present invention provides a method of controlling a motor-driven chucking device in which gripping jaws of a chuck supported by a frame provided on a body of a machine tool are opened or closed by a torque controllable driving motor to grip a workpiece. The control method includes the steps of inputting a set value for gripping force with which the gripping jaws grip the workpiece, and opening or closing the gripping jaws by controlling the rotation of the driving motor according to the set value for the gripping force.

Preferably, the above-described control method further includes the step of converting the driving torque of the driving motor and the gripping force of the chuck to each other.

The above-described control method preferably includes the step of stopping the movement of the gripping jaws when the driving torque of the driving motor has reached a value corresponding to the set value for the gripping force.

The above-described control method preferably includes the step of selecting or changing the set value for the gripping force in response to a command from an NC machining program.

Preferably, the driving motor used in the above-described control method is capable of controlling the position and travel speed of the gripping jaws, and the control method further includes the steps of inputting a set value for the gripping diameter of the workpiece, and controlling the position and travel speed of the gripping jaws by controlling the rotation of the driving motor according to the set value for the gripping diameter.

The above-described control method preferably includes the steps of converting the driving torque of the driving motor and the gripping force of the chuck to each other, and converting the rotational position of the driving motor and the position of the gripping jaws to each other.

The above-described control method preferably includes the step of outputting a gripping signal confirming that the workpiece has been gripped when the driving torque of the driving motor has reached a value corresponding to the set value for the gripping force and the gripping jaws have stopped at a position within a predetermined range from the set value for the gripping diameter.

The above-described control method preferably includes the step of selecting or changing at least one of the set value for the gripping force and the set value for the gripping diameter in response to a command from an NC machining program.

In addition, the present invention provides a method of controlling a motor-driven chucking device in which gripping jaws of a chuck supported by a frame provided on a body of a machine tool are opened or closed by a position controllable driving motor to grip a workpiece. The control method includes the steps of inputting a gripping operation initiating position of the gripping jaws, inputting a set value for the gripping diameter of the workpiece, and moving the gripping jaws to open or close between the gripping operation initiating position and the set value for the gripping diameter by controlling the rotation of the driving motor.

Preferably, the above-described control method further includes the step of selecting or changing at least one of the gripping operation initiating position and the set value for the gripping diameter in response to a command from an NC machining program.

In addition, the present invention provides a method of controlling a motor-driven chucking device in which gripping jaws of a chuck supported by a frame provided on a body of a machine tool are opened or closed by a position and speed controllable driving motor to grip a workpiece. The control method includes the steps of inputting a set value for a speed change position at which a travel speed of the gripping jaws is to be changed, and changing the travel speed of the gripping jaws to a low speed by controlling the rotation of the driving motor when the position of the gripping jaws has exceeded the set value for the speed change position in a direction for gripping the workpiece.

Preferably, the above-described control method further includes the step of selecting or changing the set value for the speed change position in response to a command from an NC machining program.

In addition, the present invention provides a method of controlling a motor-driven chucking device in which gripping jaws of a chuck supported by a frame provided on a body of a machine tool are opened or closed by a position controllable driving motor to grip a workpiece. The control method includes the steps of inputting a gripped portion dimension of a workpiece having a known gripped portion dimension, gripping the workpiece, whose gripped portion dimension has been input, with the gripping portions of the gripping jaws of the chuck, and making the present diametrical position data concerning the gripping portions coincide with position data corresponding to the gripped portion dimension.

In the above-described control method, the chuck is preferably provided on a main spindle rotatably supported by a headstock of the machine tool.

Preferably, the driving motor used in the above-described control method rotates and positions the main spindle about the axis of the main spindle, and the control method further includes the steps of bringing the main body part of the chuck into a locked state where it is unable to rotate relative to the body of the machine tool, and opening or closing the gripping jaws by controlling the driving motor while keeping the main body part in the locked state.

In addition, the present invention provides a method of controlling a motor-driven chucking device in which gripping jaws of a chuck provided on a main spindle rotatably supported by a headstock of a machine tool are opened or closed by a position controllable driving motor to grip a workpiece. The driving motor rotates and positions the main spindle about the axis of the main spindle. The control method includes the steps of inputting a set value for the gripping diameter of the workpiece, bringing the main body part of the chuck into a locked state where it is unable to rotate relative to the body of the machine tool, and opening or closing the gripping jaws by controlling the rotation of the driving motor according to the set value for the gripping diameter while keeping the main body part in the locked state.

In addition, the present invention provides an apparatus for controlling a motor-driven chucking device in which gripping jaws of a chuck supported by a frame provided on a body of a machine tool are opened or closed to grip a workpiece. The control apparatus includes a driving motor for opening or closing the gripping jaws of the chuck. The driving motor is capable of controlling gripping force with which the gripping jaws grip the workpiece. The control apparatus further includes an input device for inputting a set value for the gripping force, and a controller for controlling the rotation of the driving motor according to the set value for the gripping force so as to open or close the gripping jaws.

Preferably, the above-described control apparatus further includes a device for converting the driving torque of the driving motor and the gripping force of the chuck to each other.

The controller in the above-described control apparatus is preferably adapted to stop the movement of the gripping jaws when the gripping force has reached the set value for the gripping force.

Preferably, the above-described control apparatus further includes a storage for storing the set value for the gripping force, and a device for selecting or changing the set value for the gripping force by an NC machining program including a command for selecting or changing the set value for the gripping force.

Preferably, the input device in the above-described control apparatus allows entry of a set value for the gripping diameter of the workpiece, and the controller controls the position and travel speed of the gripping jaws by controlling the rotation of the driving motor according to the set value for the gripping diameter.

Preferably, the above-described control apparatus further includes a device for converting the driving torque of the driving motor and the gripping force of the chuck to each other, and a device for converting the rotational position of the driving motor and the position of the gripping jaws to each other.

The controller in the above-described control apparatus is preferably adapted to output a gripping signal confirming that the workpiece has been gripped when the gripping force has reached the set value for the gripping force and the gripping jaws have stopped at a position within a predetermined range from the set value for the gripping diameter.

Preferably, the above-described control apparatus further includes a storage for storing the set value for the gripping force and the set value for the gripping diameter, and a device for selecting or changing at least one of the set value for the gripping force and the set value for the gripping diameter by an NC machining program including a command for selecting or changing the set value for the gripping force and the set value for the gripping diameter.

In addition, the present invention provides an apparatus for controlling a motor-driven chucking device in which gripping jaws of a chuck supported by a frame provided on a body of a machine tool are opened or closed to grip a workpiece. The control apparatus includes a driving motor for opening or closing the gripping jaws of the chuck. The driving motor is capable of controlling the position of the gripping jaws. The control apparatus further includes an input device for inputting a set value for the gripping diameter of the workpiece and a gripping operation initiating position of the gripping jaws, and a controller for controlling the rotation of the driving motor so as to open or close the gripping jaws between the gripping operation initiating position and the set value for the gripping diameter.

Preferably, the above-described control apparatus further includes a storage for storing the set value for the gripping diameter and the gripping operation initiating position, and a device for selecting or changing at least one of the set value for the gripping diameter and the gripping operation initiating position by an NC machining program including a command for selecting or changing the set value for the gripping diameter and the gripping operation initiating position.

In addition, the present invention provides an apparatus for controlling a motor-driven chucking device in which gripping jaws of a chuck supported by a frame provided on a body of a machine tool are opened or closed to grip a workpiece. The control apparatus includes a driving motor for opening or closing the gripping jaws of the chuck. The driving motor is capable of controlling the position and travel speed of the gripping jaws. The control apparatus further includes an input device for inputting a set value for a speed change position at which the travel speed of the gripping jaws is to be changed, and a controller for controlling the rotation of the driving motor so as to change the travel speed of the gripping jaws to a low speed when the position of the gripping jaws has exceeded the set value for the speed change position during the movement of the gripping jaws in a direction for gripping the workpiece.

Preferably, the above-described control apparatus further includes a storage for storing the set value for the speed change position, and a device for selecting or changing the set value for the speed change position by an NC machining program including a command for selecting or changing the set value for the speed change position.

In addition, the present invention provides an apparatus for controlling a motor-driven chucking device in which gripping jaws of a chuck supported by a frame provided on a body of a machine tool are opened or closed to grip a workpiece. The control apparatus includes a driving motor for opening or closing the gripping jaws of the chuck. The driving motor is capable of controlling the position of the gripping jaws. The control apparatus further includes an input device for inputting the gripped portion dimension of a workpiece having a known gripped portion dimension, and a controller for effecting control such that the workpiece whose gripped portion dimension has been input is gripped with the gripping portions of the gripping jaws of the chuck, and the present diametrical position data concerning the gripping portions is made to coincide with position data corresponding to the gripped portion dimension.

Preferably, the chuck in the above-described control apparatus is provided on a main spindle rotatably supported by a headstock of the machine tool.

Preferably, the above-described control apparatus further includes a lock/unlock switching mechanism for switching between a locked state where the main body part of the chuck is unable to rotate relative to the body of the machine tool and an unlocked state where the main body part is rotatable relative to the body of the machine tool. The driving motor rotates and positions the main spindle about the axis of the main spindle. The controller controls the lock/unlock switching mechanism so as to bring the main body part into the locked state, and then controls the driving motor to perform an open-close operation of the gripping jaws.

The lock/unlock switching mechanism in the above-described control apparatus preferably operates such that in the locked state the lock/unlock switching mechanism allows the main body part and the main spindle to rotate relative to each other, whereas in the unlocked state the lock/unlock switching mechanism disables the main body part and the main spindle from rotating relative to each other.

In addition, the present invention provides an apparatus for controlling a motor-driven chucking device in which gripping jaws of a chuck provided on a main spindle rotatably supported by a headstock of a machine tool are opened or closed to grip a workpiece. The control apparatus includes a position controllable driving motor for rotating and positioning the main spindle about the axis of the main spindle and for opening or closing the gripping jaws of the chuck. The control apparatus further includes a lock/unlock switching mechanism for switching between a locked state where the main body part of the chuck is unable to rotate relative to the body of the machine tool and an unlocked state where the main body part is rotatable relative to the body of the machine tool. The control apparatus further includes an input device for inputting a set value for the gripping diameter of the workpiece, and a controller for controlling the lock/unlock switching mechanism so as to bring the main body part into the locked state and for controlling the rotation of the driving motor according to the set value for the gripping diameter to open or close the gripping jaws.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 3 is a diagram showing the arrangement of a control panel of the chuck.

FIG. 4 is a diagram showing a chuck maintenance screen displayed on a display device of the NC lathe.

FIG. 12 is a diagram showing an example of an NC machining program for selecting a group of chucking data.

FIG. 13 is a diagram showing an example of an NC machining program for changing chucking data.

DESCRIPTION OF THE PREFERRED EMBODIMENTS

Figure 1A:
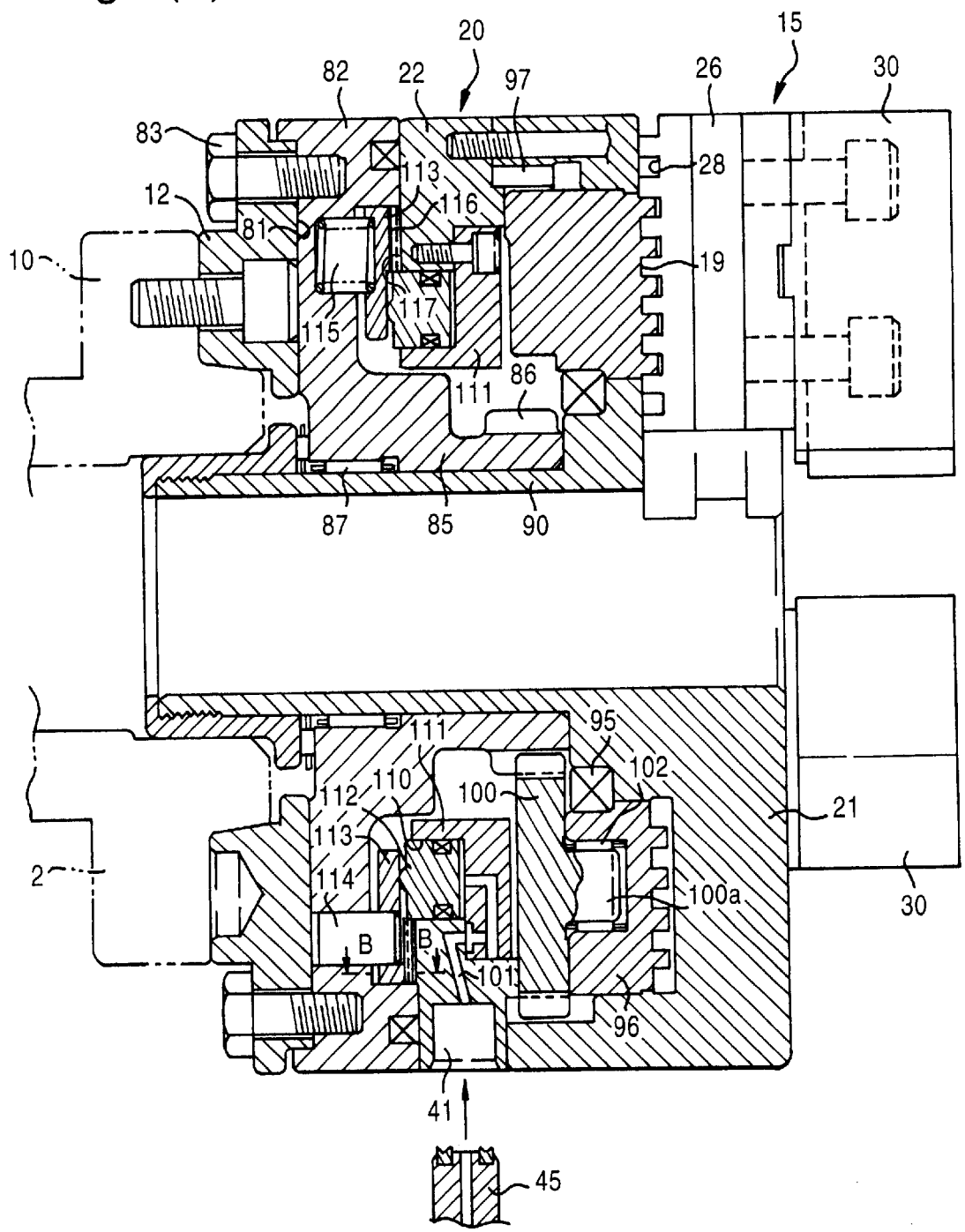
FIG. 1 is a sectional view of a chuck of an NC lathe to which the present invention is applied.
Figure 1B:
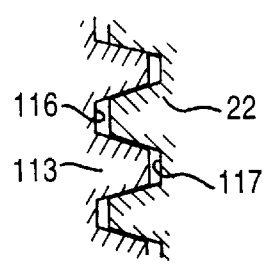

An embodiment of the present invention will be described below with reference to the accompanying drawings. FIG. 1 is a sectional view of a chuck 15 mounted on the nose of a main spindle 2 of an NC (Numerically-controlled) lathe as a machine tool to which the present invention is applied. Part (b) of FIG. 1 is an enlarged sectional view as seen from the arrow B—B in part (a) of FIG. 1. It should be noted that the machine tool is not necessarily limited to the NC lathe but may be a turning center, a grinding machine, etc.

Figure 2:
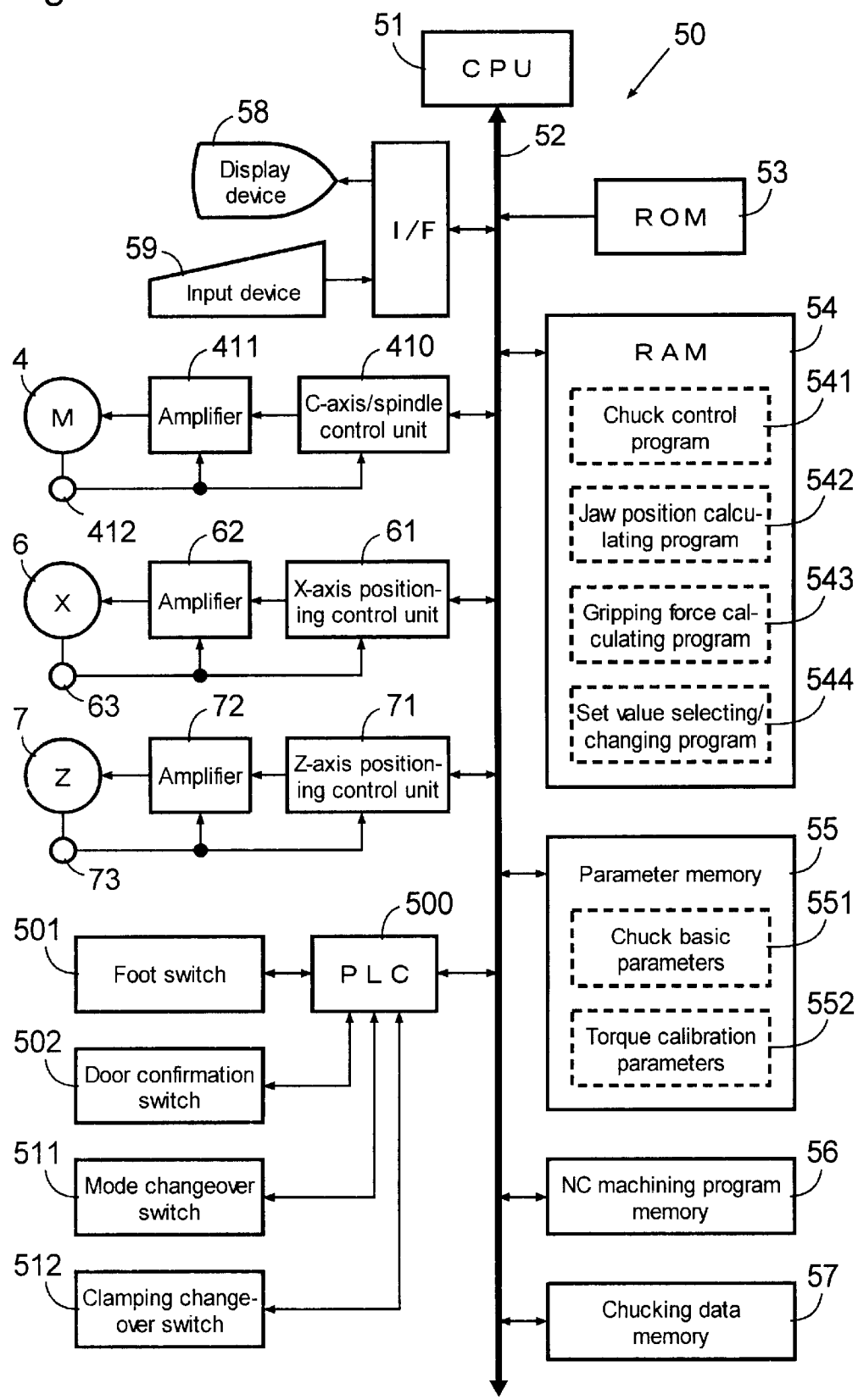
FIG. 2 is a block diagram showing the arrangement of an NC system.

The main spindle 2 is rotatably supported by a headstock (not shown) and rotatively driven by a spindle motor 4 (see FIG. 2). A face plate 12 is bolted to the forward end of a nose 10 of the main spindle 2. A driving gear securing plate 82 is secured to the front side 81 of the face plate 12, which is secured to the spindle nose 10, by using bolts 83. A scroll supporting cylinder 90 is rotatably supported in a center bore of the driving gear securing plate 82 through rolling elements 87, which constitute a needle bearing. The scroll supporting cylinder 90 is integral with a first member 21 extending forward of it.

A driving gear 86 is formed on the outer periphery of a driving gear body 85 which is integral with the driving gear securing plate 82. In short, the driving gear body 85 is secured to the main spindle 2. A scroll 96 is rotatably supported through a bearing 95 on the outer periphery of the forward end of the scroll supporting cylinder 90. The front end surface of the scroll 96 is formed with a spiral scroll groove 19 centered at the center axis of the main spindle 2. Scroll teeth 28 formed on the rear surface of a master jaw 26 are in mesh with the spiral scroll groove 19. The master jaw 26 is radially movable along a guide groove formed on the first member 21. There are a plurality (three, for example) of master jaws 26 which are circumferentially spaced at a predetermined angle. The master jaws 26 have gripping jaws 30 secured thereto, respectively.

An internal gear 97 is formed on the inner peripheral surface of the first member 21, which is integral with the scroll supporting cylinder 90. Three intermediate gears 100 are placed at equiangular positions between the driving gear 86 and the internal gear 97 and engaged with these gears. A shaft 100a of each intermediate gear 100 is rotatably supported by the scroll 96 through rolling elements 102, which constitute a needle bearing. Thus, the driving gear 86, the intermediate gears 100 and the internal gear 97 constitute a planetary gear mechanism to act as a kind of speed reduction mechanism.

A second member 22 is integrally secured to the first member 21. The second member 22 is formed with a positioning hole 41. A locking pin 45 is inserted into the positioning hole 41 to prevent rotation of a main body part 20, which comprises the first member 21, the second member 22, etc., relative to the body of the machine tool, e.g. the headstock. The locking pin 45 has a supply passage provided in the center thereof to supply pressurized air. After the locking pin 45 has been inserted into the positioning hole 41, a control valve (not shown) is opened to supply pressurized air into the positioning hole 41 from the locking pin 45.

An annular cylinder member 111 is secured to the second member 22. A cylinder chamber 110, which is an annular space, is defined between the second member 22 and the cylinder member 111. The cylinder chamber 110 has a rectangular sectional configuration. An annular piston 112 is inserted in the cylinder chamber 110. The cylinder chamber 110 and the piston 112 constitute a cylinder mechanism that is actuated by air pressure.

Pressurized air supplied into the positioning hole 41 from the locking pin 45 passes through an air supply passage 101 extending through the second member 22 and the cylinder member 111 to drive the piston 112. An annular clutch plate 113 is disposed at the rear of the piston 112 so as to contact a projection on the end surface of the piston 112. Three guide pins 114 are secured to the front side of the driving gear securing plate 82 at equiangular positions. The annular clutch plate 113 is placed on the guide pins 114 so as to be movable back and forth.

Coil springs 115 are placed at the rear of the clutch plate 113 at equiangular positions. The coil springs 115 urge the piston 112 forwardly through the clutch plate 113. Clutch teeth 116 are formed on the front end surface of the clutch plate 113. Clutch teeth 117 are formed on the rear side of the second member 22 so as to face opposite to the clutch teeth 116. When the clutch teeth 116 and the clutch teeth 117 engage each other, the second member 22 and the main spindle 2 are locked so that they will not move relative to each other. During machining, the clutch teeth 116 and the clutch teeth 117 are engaged with each other by urging forces of the coil springs 115, and thus the main spindle 2 and the main body part 20 of the chuck 15 are locked to each other.

Next, the operation of the chuck 15 will be described. To actuate the chuck 15 to hold a workpiece, first, an NC system 50 (see FIG. 2) sends out a main spindle indexing command to a C-axis/spindle control unit 410 to position and stop the main spindle 2 at a predetermined angular position. Next, the locking pin 45 is inserted into the positioning hole 41 to set the main body part 20 in a locked state where it is unable to rotate relative to the body of the machine tool, such as the headstock, the bed, etc. After the locking pin 45 has been inserted into the positioning hole 41, the control valve is opened to supply pressurized air into the positioning hole 41 from the locking pin 45.

Pressurized air supplied into the positioning hole 41 through the center of the locking pin 45 is supplied through the air supply passage 101, which is formed in the second member 22 and the cylinder member 111, to drive the piston 112. Driving the piston 112 causes the clutch plate 113 to move rearwardly while compressing the coil springs 115. This movement of the clutch plate 113 disengages the clutch teeth 116 and 117 from each other. Consequently, the second member 22 of the main body part 20 and the main spindle 2 become rotatable relative to each other.

With the main body part 20 of the chuck 15 placed in the locked state, the main spindle 2 is rotatively driven by the spindle motor to cause the scroll 96 to rotate though the speed reduction mechanism, which comprises the driving gear 86, the intermediate gears 100 and the internal gear 97, thereby opening or closing the gripping jaws 30 to release or grip a workpiece. The driving torque of the main spindle 2 is transmitted to the scroll 96 after it has been increased through the speed reduction mechanism. Upon completion of the workpiece releasing or gripping operation, the locking pin 45 is pulled out from the positioning hole 41 to make the main body part 20 of the chuck 15 free to rotate relative to the body of the machine tool, such as the headstock. At the same time, the piston 112 is moved forwardly by the urging forces of the coil springs 115 because there is no longer the pressure of pressurized air. Consequently, the clutch teeth 116 and 117 are engaged with each other, and thus the main spindle 2 and the main body part 20 of the chuck 15 are locked to each other. Thus, the workpiece held by the chuck 15 is ready to undergo machining.

Although in the above-described embodiment the piston 112 is driven by pressurized air, it should be noted that the piston 112 may be moved by a mechanical transmission mechanism when the locking pin 45 is inserted into the positioning hole 41.

FIG. 2 is a block diagram showing the arrangement of the NC system 50 and control motors. As the NC system 50, it is possible to use a system designed specially for an NC machine tool or a personal computer NC system in which an NC board or the like for performing servo-motor control, sequence control, etc. is plugged into an expansion slot of a small-sized computer for personal use (hereinafter referred to as "personal computer") to have numerical control function and personal computer function. The NC system 50 is provided with a CPU 51 as an information processing unit that performs various data processing operations. The CPU 51 is connected with a ROM 53 and a RAM 54 as a main storage through a bus 52.

The CPU 51 operates according to a system program and data stored in the ROM 53 and a program and data loaded (read) into the RAM 54. Programs which may be loaded into the RAM 54 include an OS (Operating System), which is a basic program, an NC command processing program for executing processing corresponding to each of a large number of NC commands, a chuck control program 541 for executing processing based on NC commands relating to chuck open-close control, in particular, among the NC commands, a jaw position calculating program 542, a gripping force calculating program 543, a display control program for controlling the display of characters and figures on a display device 58.

The jaw position calculating program 542 is a program for calculating a relationship between the position of the gripping jaws 30 of the chuck 15 and the C-axis coordinate value of the main spindle 2. One of the gripping jaw position and the C-axis coordinate value is obtained from the other by calculation. The term "C-axis" as used herein means a control axis for controlling the angular position about the axis of the main spindle 2. The position of the gripping jaws 30 is displayed and input in the form of a diameter. In the NC system 50, however, the gripping jaw position is converted into C-axis coordinate value form and stored and managed in this form. The C-axis coordinate value and the position of the gripping jaws 30 are in proportional relationship to each other when the origin is set appropriately.

More specifically, the relationship between the C-axis coordinate value $c$ and the gripping jaw position $d$ is expressed by $c = k \cdot d$. In this expression, $k$ is a conversion constant, which depends on the speed reduction ratio for the driving torque transmitted from the main spindle 2, the pitch of the scroll 96 and so forth. The amount of movement and the travel speed are also converted by using the same conversion constant $k$. The jaw position calculating program 542 converts the coordinate values of the C-axis and the gripping jaw position by using the conversion constant $k$ and also converts the amount of movement and the travel speed by using the conversion constant $k$. When displayed on the display device 58, the gripping jaw position is converted into a diameter value and displayed in this form. Entry of the gripping jaw position is also performed in the form of a diameter value. This allows the operator to readily appreciate the gripping jaw position.

The gripping force calculating program 543 is a program for obtaining one of driving torque of the spindle motor 4 and gripping force of the gripping jaws 30 from the other by calculation based on the relationship between the driving torque and the gripping force. The relationship between the torque and the gripping force differs for each individual chuck 15. Therefore, the relationship between the torque and the gripping force is previously stored in the form of a table in a memory area for torque calibration parameters 552 (described later). A set value selecting/changing program 544 is a program for selecting a group of chucking data stored in a chucking data memory 57 or changing chucking data in response to a command from an NC machining program.

The CPU 51 is further connected with a parameter memory 55 through the bus 52. The parameter memory 55 contains various parameters necessary for machining. Using a non-volatile memory as the parameter memory 55 allows the memory contents to be maintained even when the power supply of the NC system 50 is turned off. In the parameter memory 55, an area for chuck basic parameters 551 and an area for torque calibration parameters 552 are set.

The chuck basic parameters 551 are various parameters inherent in the chuck 15, which are displayed on a chuck maintenance screen (see FIG. 4) of the display device 58. The chuck basic parameters 551 are set by the machine tool manufacturer. Usually, the user does not change the chuck basic parameters 551. The torque calibration parameters 552 are parameters for calculating a relationship between each torque limiting value for the spindle motor 4 and a gripping force produced by the gripping jaws 30 of the chuck 15. For example, the range of torque produced by the spindle motor 4, i.e. between a minimum torque and a maximum torque, is divided into tenths, and gripping forces corresponding to 10%, 20%, 30%, 40%, 50%, 60%, 70%, 80%, 90% and 100% torque are measured and stored in advance. Gripping forces corresponding to intermediate torques are assumed to be on a straight line and obtained by interpolation.

Intervals at which the torque is measured and stored are not necessarily limited to 10% but may be any desired intervals. The intervals do not always need to be equal intervals. The relationship between the torque and the gripping force may be stored in the form of a mathematical expression. The torque calibration parameters 552 are also parameters inherent in the chuck 15, which are set by the machine tool manufacturer. Usually, the user does not change the torque calibration parameters 552. However, it is possible for the user to change the torque calibration parameters 552.

The CPU 51 is further connected with an NC machining program memory 56 and a chucking data memory 57 through the bus 52. The NC machining program memory 56 contains an NC machining program for releasing a workpiece from the chuck 15, actuating the chuck 15 to hold a workpiece, and performing machining by moving a tool post (not shown) and the headstock relative to each other in the direction of a Z-axis (a coordinate axis parallel to the main spindle axis) and also in the direction of an X-axis (a coordinate axis perpendicular to the Z-axis) under control. The chucking data memory 57 contains various data to be displayed on a chuck setting screen (see FIG. 5) of the display device 58. Chucking data is set by the user for each type of workpiece.

The CPU 51 is connected with input/output equipment through the bus 52. As the input/output equipment, a display device 58 for displaying characters and figures and an input device 59 used by the operator to input data are connected to the bus 52 through an interface circuit. As the display device 58, a CRT, an EL display panel, a liquid crystal display, etc. can be used. As the input device 59, a keyboard, a touch panel that is combined with the display device 58 as one unit, etc. can be used.

The CPU 51 may be connected with a fixed disk unit as an auxiliary storage through the bus 52. In this case, the fixed disk unit contains various programs to be executed by the CPU 51, and these programs are loaded from the fixed disk unit into the RAM 54 or the NC machining program memory 56 as occasion demands.

The NC system 50 is connected to the spindle motor 4 of the NC lathe through the C-axis/spindle control unit 410 and an amplifier 411. The velocity of revolutions (rotational speeds) of the spindle motor 4 is fed back to the amplifier 411 through a detector 412 to maintain a predetermined velocity of revolutions. The angular position about the C-axis of the main spindle 2 is fed back to the C-axis/spindle control unit 410 from the detector 412, thereby allowing the main spindle 2 to be positioned at a desired angular position.

Similarly, the NC system 50 is connected to an X-axis motor 6 of the NC lathe through an X-axis positioning control unit 61 and an amplifier 62 to control the relative movement of the workpiece and the tool post in an X-axis direction (direction perpendicularly intersecting a Z-axis direction). The velocity of revolutions of the X-axis motor 6 and the rotation angle are fed back to the amplifier 62 and the X-axis positioning control unit 61 through a detector 63 and used for the speed and position control of the relative movement of the workpiece and the tool post in the X-axis direction. The combination of a Z-axis motor 7, a Z-axis positioning control unit 71, an amplifier 72 and a detector 73 also functions in the same way as that for the X-axis. That is, these devices are arranged to control the relative movement of the workpiece and the tool post in a Z-axis direction (direction parallel to the main spindle axis).

The NC system 50 is further connected with a foot switch 501, a door confirmation switch 502, a mode changeover switch 511 and an internal/external clamping changeover switch 512 through a PLC (Programmable Logic Controller) 500. The foot switch 501 is a foot-operated switch for selectively opening or closing the chuck 15 by a manual operation. The door confirmation switch 502 is a sensor for confirming that a door for closing the machining area of the NC lathe is in a closed position.

The mode changeover switch 511 is a switch for changing over the operating modes of the chuck 15 between a machining mode and a chucking mode by a manual operation. The internal/external clamping changeover switch 512 is a switch for changing over workpiece holding directions (to select either a workpiece holding mode in which the workpiece is held at the inner periphery thereof or a workpiece holding mode in which the workpiece is held at the outer periphery thereof). In addition, the PLC 500 is connected with an actuator (not shown) for driving the locking pin 45 and a position sensor for detecting whether the locking pin 45 has been inserted or pulled out.

FIG. 3 is a diagram showing the arrangement of a control panel 510 of the chuck 15. The control panel 510 is provided with the above-described mode changeover switch 511. When the mode changeover switch 511 is turned to align a notch 511a with either "MACHINING" or "CHUCKING" and the central portion of the mode changeover switch 511 is pressed, the selected machining or chucking mode is enabled. The chucking mode is a mode of holding a workpiece with the chuck 15 and releasing it from the chuck 15. The machining mode is a mode of machining a workpiece held with the chuck 15. When the machining mode is selected, an LED 515 turns on. When the chucking mode is selected, an LED 516 turns on. When the machining mode is changed over to the chucking mode, detection of the position of the door confirmation switch 502 is carried out. If the door for closing the machining area is not closed, an alarm is indicated, and a chucking operation will not be carried out. Therefore, the safety of the operator is ensured.

A preparatory open-close mode switch 514 is a pushbutton switch. Every time the switch 514 is pressed, the preparatory open-close mode changes between "ON" and "OFF". When the preparatory open-close mode is in an "ON" state, the pushbutton itself is in a lighted stated. The preparatory open-close mode is a mode in which the operator moves the gripping jaws 30 by a manual operation. The internal/external clamping changeover switch 512 is a switch for selecting either a workpiece holding mode in which the workpiece is held at the inner periphery thereof (internal clamping) or a workpiece holding mode in which the workpiece is held at the outer periphery thereof (external clamping).

A grip/release changeover switch 513 is a toggle switch for selecting a jaw moving direction for gripping or releasing a workpiece. If the lever of the switch 513 is tilted toward "CLAMP", the direction for gripping a workpiece is selected. If the lever is tilted toward "UNCLAMP", the direction for releasing a workpiece is selected. In the preparatory open-close mode, the operator selects a moving direction of the gripping jaws 30 by actuating the internal/external clamping changeover switch 512 and the grip/release changeover switch 513 and then causes the gripping jaws 30 to move by stepping on the foot switch 501. The gripping jaws 30 move only when the foot switch 501 is ON.

FIG. 4 is a diagram showing a chuck maintenance screen displayed on the display device 58 of the NC system 50. This screen is provided for the machine tool manufacturer to set the chuck basic parameters 551. The screen is also used to perform maintenance of the machine tool. The user cannot change the chuck basic parameters 551 from the chuck maintenance screen. As shown on the screen, the chuck basic parameters 551 include hardware basic parameters and software basic parameters.

Figure 5:
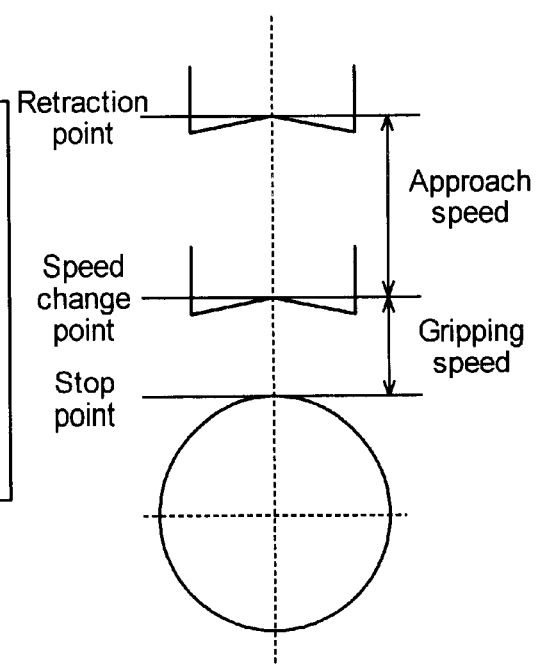
FIG. 5 is a diagram showing a chuck setting screen displayed on the display device.

These are parameters inherent in the chuck of each individual machine tool. Each parameter can be changed and set by changing the cursor position with cursor keys (not shown). A line corresponding to the cursor position is underlined, and the heading characters in this line are displayed in reverse video. In FIG. 4, the cursor is on the line of C-axis command speed V1, and a value for C-axis command speed V1 can be set. If the "SET" key of the function keys displayed on this screen is pressed down, a chuck setting screen as shown in FIG. 5 is displayed.

The hardware basic parameters will be described below. Maximum input torque is the value of a maximum driving torque of the spindle motor 4. Maximum gripping force is gripping force obtained when the spindle motor 4 generates the maximum driving torque. Minimum gripping force is a lower-limit value of gripping force with which a workpiece can be gripped. Gripping force setting unit is a unit quantity used in gripping force setting. In FIG. 4, units of these forces are kgf (kilogram-force). However, the forces may be set in units of N (newton).

In-chuck reduction ratio is a speed reduction ratio in transmission of rotation from the main spindle 2 to the scroll 96. Scroll pitch is the pitch of the scroll groove 19 of the scroll 96. Internal clutch tooth pitch is the pitch of the clutch teeth 116 and 117 of the clutch plate 113 and the second member 22. Stop position of the main spindle 2 must be one of positions each determined by the angle of internal clutch tooth pitch (i.e. positions where the clutch teeth 116 and 117 are engageable).

Next, the software basic parameters will be described. Stroke upper limit is a stroke limiting value on the largest diameter side of the gripping jaws 30. Stroke lower limit is a stroke limiting value on the smallest diameter side of the gripping jaws 30. Torque limiting value T1 is a torque limiting value used when the gripping jaws 30 move at high speed and also used during an unclamping operation. T1 is input in the form of a percentage with respect to the maximum torque. C-axis command speed V1 is a C-axis travel speed of the gripping jaws 30 at the time of moving at high speed, which is, for example, C-axis rapid traverse speed. C-axis command speed V2 is a C-axis travel speed of the gripping jaws 30 at the time of moving at low speed (during a gripping operation, for example). C-axis command speed V3 is a C-axis travel speed of the gripping jaws 30 at the time of moving at ultra-low speed (during movement from a stop point to a grip point, for example). Units of V1, V2 and V3 are revolutions per minute.

FIG. 5 is a diagram showing a chuck setting screen displayed on the display device 58 of the NC system 50. The chuck setting screen displays various chucking data stored in the chucking data memory 57. Regarding the chucking data, a group of chucking data is stored for each type of workpiece (i.e. for each type of machining). A plurality of such groups of chucking data are stored in the chucking data memory 57. Chucking data can be freely set by the user.

The chucking data will be described below. Parameter group No. is a number given to each group of chucking data. NC program No. is the program number (O number) of an NC machining program that uses the relevant group of chucking data. Gripping force is a set value for gripping force for holding a workpiece. Units of setting may be kgf (kilogram-force) or N (newton). Data concerning the gripping force is converted into a torque limiting value T2 for the spindle motor 4 and stored.

Gripping diameter is a set value for the workpiece gripping position. Speed change point is a set value for a position where the travel speed of the gripping jaws 30 is changed from high speed to low speed. Retraction point is a set value for a retraction position of the gripping jaws 30, that is, a gripping operation initiating position. Both the speed change point and the retraction point are displayed in the form of diameters. Mandrel diameter is a diameter of a mandrel used when gripping jaws are machined as soft jaws. Error detection level is used when gripping error detection is performed by calculating an error between the position of the gripping jaws 30 at the time of gripping a workpiece and the set gripping diameter. If the error is not within the set value for the error detection level, it is decided to be "gripping error". The error detection level is input in the form of a percentage with respect to the gripping diameter. It should be noted that a tolerance set value (mm) may be input as an error detection level in place of the percentage.

The operator can set these items of chucking data and give a desired parameter group No. to the group of chucking data to store them. The stored group of chucking data can be read at any time. Each item of chucking data can be input or changed by changing the cursor position with cursor keys (not shown). A line corresponding to the cursor position is underlined, and the heading characters in this line are displayed in reverse video. In FIG. 5, the cursor is on the line of gripping diameter, and a value of gripping diameter can be entered. Below the chucking data, items of data concerning the present position of the gripping jaws 30 and the stop point are displayed. An image showing a positional relationship between the retraction point, the speed change point and the stop point is shown in the right-hand half of the screen.

It should be noted that the chucking data can be changed from the NC machining program. Selection of a parameter group can also be made from the NC machining program. The selection of a parameter group and the change of chucking data that are made in response to a command from the NC machining program are executed by the set value selecting/changing program 544.

If the "MAINTENANCE" key of the function keys displayed on the screen shown in FIG. 5 is pressed down, the chuck maintenance screen shown in FIG. 4 is displayed. The "TEACH" key is used to teach the diameter of a workpiece held by the gripping portions of the gripping jaws 30 to perform an operation of making the gripping jaw position managed by the NC system 50 and the actual position of the gripping portions of the gripping jaws 30 coincide with each other. For example, in a case where the gripping jaws 30 are soft jaws, the gripping portions are machined in conformity to the shape of a workpiece to be held by the jaws. Therefore, every time the gripping jaws 30 are machined, the configuration of the gripping portions and the gripping position dimension deviate from the stored data.

In a case where the gripping position dimension and so forth have deviated after the machining of the gripping jaws 30, an object to be gripped whose diameter is known is held with the machined gripping portions of the gripping jaws 30 of the chuck 15, and the known diameter value is entered as a gripping diameter on the chuck setting screen. Then, the "TEACH" key is pressed down. Consequently, the present position of the gripping jaws 30 is changed to the entered known diameter value, and thus the gripping jaw position stored in the NC system 50 and the actual position of the gripping portions of the gripping jaws 30 coincide with each other. The teach processing is executed by the chuck control program 541.

The "LIST" key of the function keys provides at-a-glance display of a plurality of groups of chucking data stored. The chucking data memory 57 can store a plurality of groups (e.g. 40 groups) of chucking data. From among the plurality of groups of chucking data, one that is used in machining to be executed can be selected and called up to the screen. The "DELETE" key is used to delete a group of chucking data displayed at present. If the "DELETE" key is pressed down, the presently displayed group of chucking data is deleted from the chucking data memory 57.

Figure 6A:
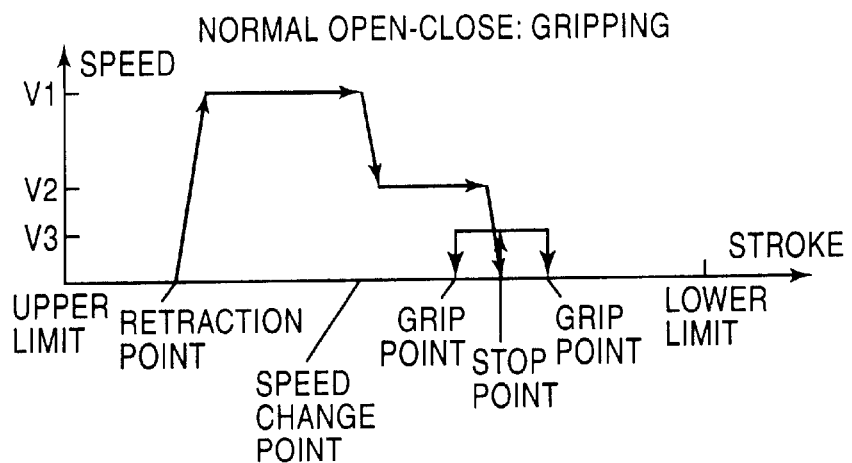
FIG. 6 is a diagram showing the control of the position and speed of gripping jaws in a normal open-close operation of the chuck.
Figure 6B:
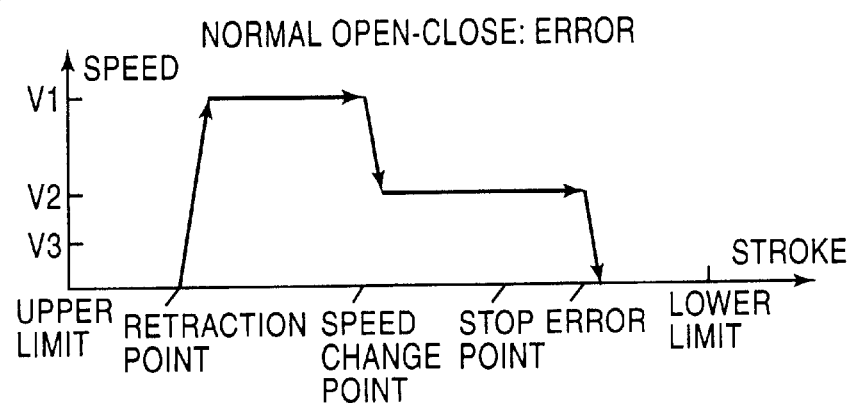
Figure 6C:
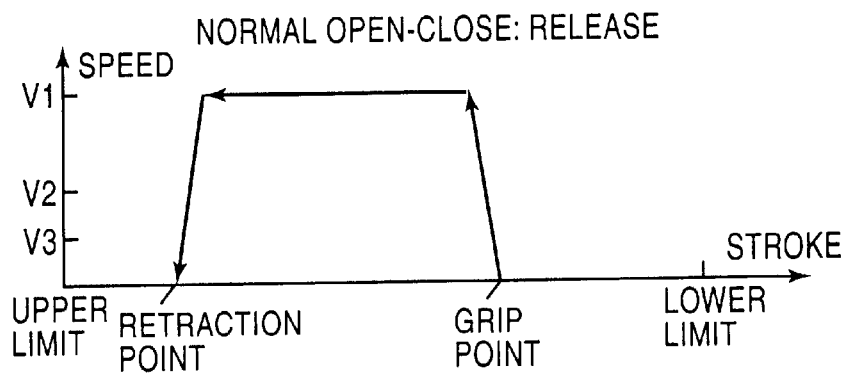
Figure 7A:
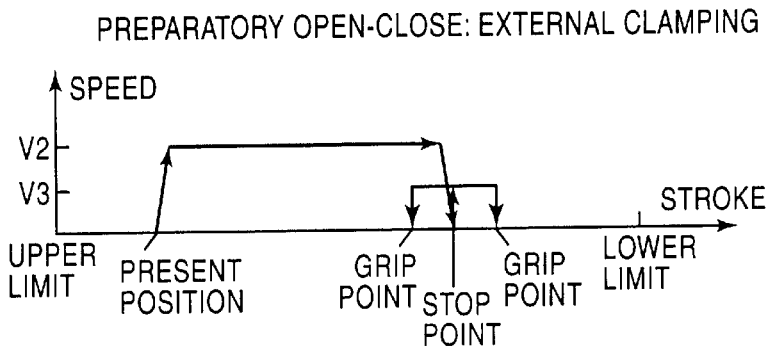
FIG. 7 is a diagram showing the control of the position and speed of the gripping jaws in a preparatory open-close operation of the chuck.
Figure 7B:
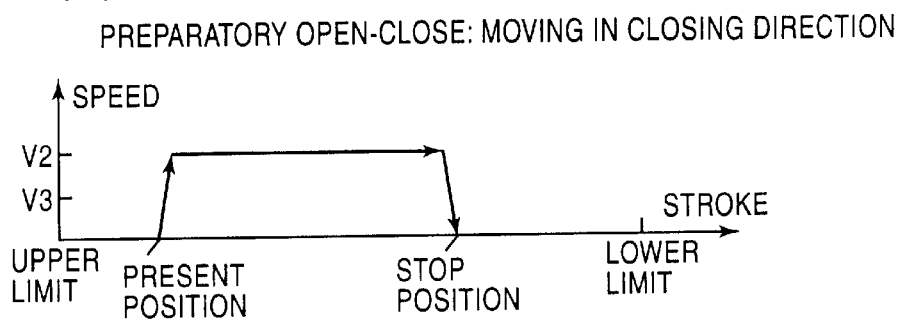
Figure 7C:
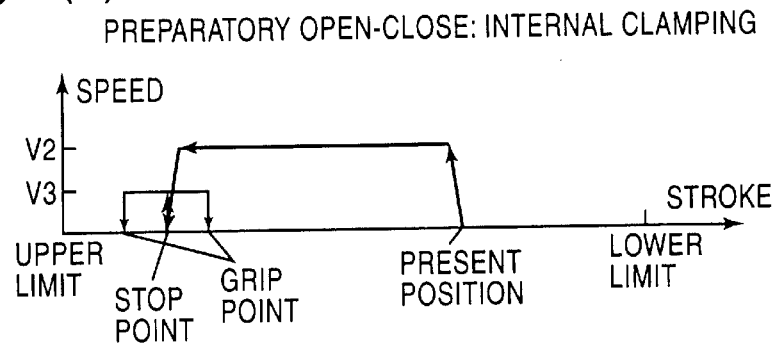
Figure 7D:
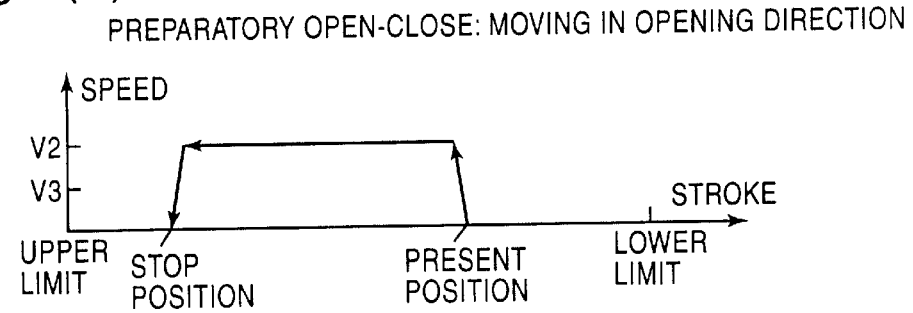

FIG. 6 is a diagram showing the control of the position and speed of the gripping jaws 30 in a normal open-close operation of the chuck 15. The normal open-close operation is an operation taking place when the mode changeover switch 511 on the control panel 510 is changed over to the chucking mode to grip and release a workpiece automatically. Part (a) of FIG. 6 shows an example in which a workpiece is normally gripped by external clamping in the normal open-close operation. With the gripping jaws 30 placed at the retraction position, a workpiece is set, and the machining area-closing door is closed. Then, the mode changeover switch 511 on the control panel 510 is changed over to the chucking mode. In this state, the foot switch 501 is stepped on once. Consequently, the gripping jaws 30 move from the retraction point to the speed change point at high speed V1 and further moves from the speed change point to the stop point at low speed V2.

Then, the gripping jaws 30 grip the workpiece. The movement of the gripping jaws 30 is stopped when the driving torque of the spindle motor 4 has reached the torque limiting value T2, which corresponds to the gripping force. The stop position of the main spindle 2 (i.e. a grip point of the gripping jaws 30) must be one of positions each determined by a predetermined angle at which the clutch teeth 116 and 117 are engageable. Therefore, the movement of the gripping jaws 30 is controlled so that the gripping jaws 30 move at ultra-low speed V3 from the stop point determined by the torque limiting value T2 to the nearest one of grip points each determined by a predetermined angle and stop at the nearest grip point.

Part (b) of FIG. 6 shows an example in which an error arises in gripping of a workpiece by external clamping in the normal open-close operation. The gripping jaws 30 move from the retraction point to the speed change point at high speed V1 and further moves from the speed change point to the stop point at low speed V2. Normally, as shown in part (a) of FIG. 6, the movement of the gripping jaws 30 is stopped when the driving torque of the spindle motor 4 has reached the torque limiting value T2, which corresponds to the gripping force. In the case of part (b), the driving torque does not reach the torque limiting value T2 even when the gripping jaws 30 have exceeded a position apart from the stop point by a predetermined distance, resulting in an error. This error may be caused by idle machining (i.e. an operation in which the machine tool is operated with no workpiece attached to the chuck to confirm a machining operation). Therefore, it is not always necessary to output an error signal or the like.

Part (c) of FIG. 6 shows an example in which a workpiece held by external clamping is released in the normal open-close operation. The gripping jaws 30 move from the grip point to the retraction point at high speed V1. It should be noted that the above-described normal open-close operation may be carried out on the basis of commands from the NC machining program (e.g. commands for auxiliary function) in place of the actuation of the foot switch 501 and so forth.

FIG. 7 is a diagram showing the control of the position and speed of the gripping jaws 30 in the preparatory open-close mode of the chuck 15. The preparatory open-close mode is a mode in which the preparatory open-close mode switch 514 on the control panel 510 is turned "ON" and the operator moves the gripping jaws 30 by a manual operation. The operator selects a direction of movement of the gripping jaws 30 with the internal/external clamping changeover switch 512 and the grip/release changeover switch 513 and steps on (turns ON) the foot switch 501 with his/her foot, thereby causing the gripping jaws 30 to move. The gripping jaws 30 move only when the foot switch 501 is ON.

Part (a) of FIG. 7 shows an example in which a workpiece is gripped by external clamping in the preparatory open-close mode. The gripping jaws 30 move from the present position to the stop point at low speed V2 in response to pressure on the foot switch 501. Then, the gripping jaws 30 grip a workpiece. The movement of the gripping jaws 30 is stopped when the driving torque of the spindle motor 4 has reached the torque limiting value T2, which corresponds to the gripping force. Then, the gripping jaws 30 move at ultra-low speed V3 from the stop point determined by the torque limiting value T2 to the nearest one of grip points each determined by a predetermined angle and stop at the nearest grip point. In this regard, the control operation is the same as in the case of part (a) of FIG. 6.

Part (b) of FIG. 7 shows an example in which the gripping jaws 30 are merely moved in the closing direction in the preparatory open-close mode. The gripping jaws 30 move from the present position in the closing direction at low speed V2 in response to pressure on the foot switch 501 and stop at a position where the foot switch 501 is released. Part (c) of FIG. 7 shows an example in which a workpiece is gripped by internal clamping in the preparatory open-close mode. The speed control is the same as in the case of part (a) of FIG. 7 except the direction of movement of the gripping jaws 30. Part (d) of FIG. 7 shows an example in which the gripping jaws 30 are merely moved in the opening direction. The speed control is the same as in the case of part (b) of FIG. 7 except the direction of movement of the gripping jaws 30.

Figure 8:
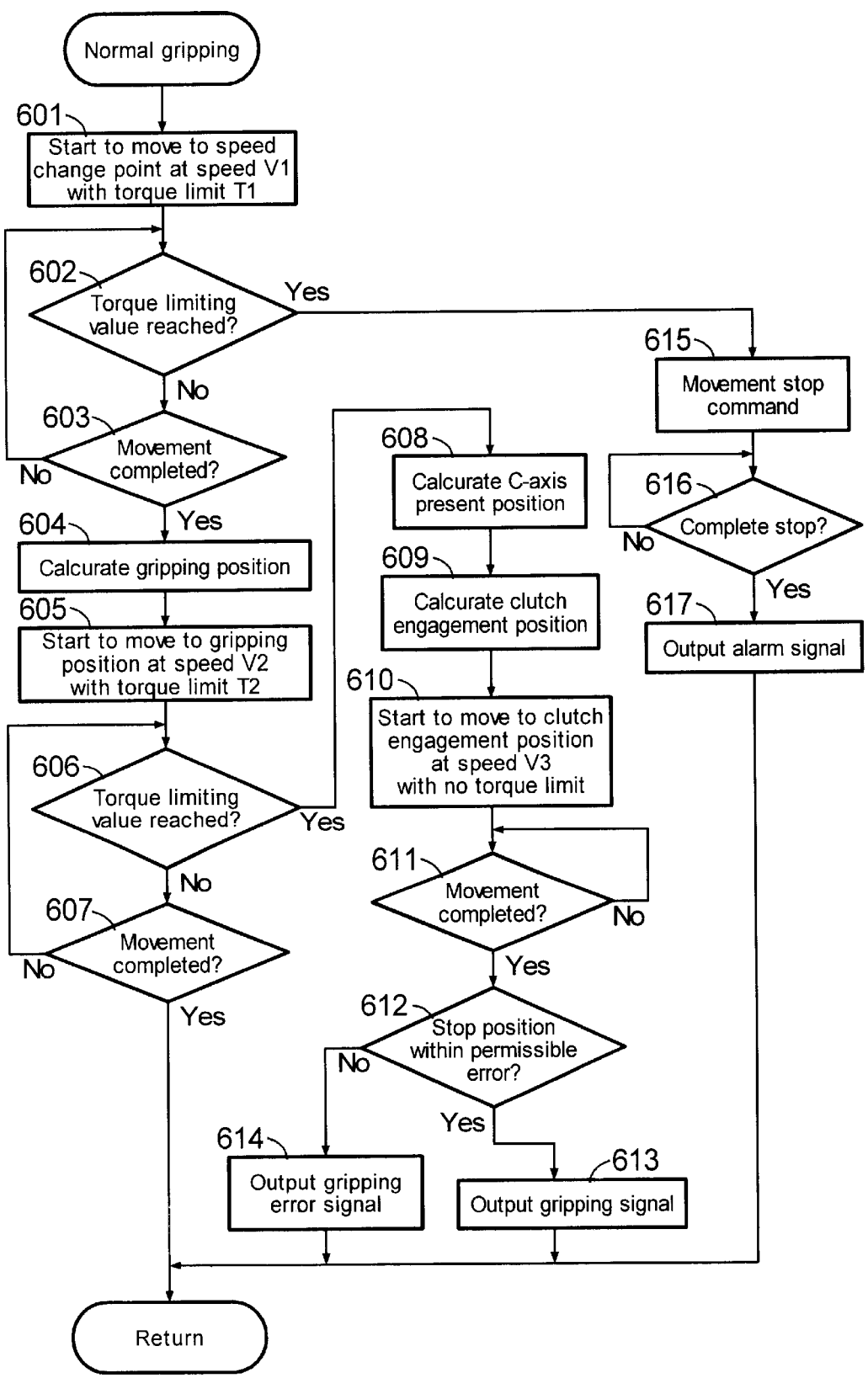
FIG. 8 is a flowchart showing the control of a normal gripping operation of the chuck.

FIG. 8 is a flowchart showing gripping control in the normal open-close operation of the chuck 15. The flowchart shows processing for effecting control as shown in parts (a) and (b) of FIG. 6. The program for executing the illustrated processing is contained in the chuck control program 541 and called from the main routine of the chuck control program 541. When a normal gripping operation is initiated, the gripping jaws 30 start to move from the retraction point to the speed change point at high speed V1 and with torque limiting value T1 at step 601.

At the subsequent step 602, it is judged whether or not the driving torque of the spindle motor 4 has reached the torque limiting value T1. If the torque limiting value T1 has been reached, the process proceeds to step 615. That the driving torque has reached the torque limiting value T1 at this point of time reveals the presence of an abnormality, for example, a wrong workpiece, which is different in type from the desired one. At step 615, a movement stop command is delivered to the C-axis/spindle control unit 410 to stop the gripping jaws 30 on account of abnormality. At step 616, the process waits until the gripping jaws 30 come to a complete stop. After the gripping jaws 30 have come to a complete stop, an alarm signal is output at step 617, and then the process returns to the main routine.

If it is judged at step 602 that the torque limiting value T1 has not yet been reached, a judgment is made at step 603 as to whether or not the movement to the speed change point has been completed. If the movement has not yet been completed, the process returns to step 602, whereas if the movement has been completed, the process proceeds to step 604. At step 604, a gripping position is calculated by adding a permissible stop position error to the position on the C-axis that corresponds to the gripping diameter. It should be noted that a predetermined value may be added in place of the permissible stop position error. The calculation is performed by the jaw position calculating program 542. At the subsequent step 605, the gripping jaws 30 start to move to the calculated gripping position at low speed V2 and with torque limiting value T2.

At the subsequent step 606, it is judged whether or not the driving torque of the spindle motor 4 has reached the torque limiting value T2. If the torque limiting value T2 has not yet been reached, the process proceeds to step 607 at which a judgment is made as to whether or not the movement to the gripping position has been completed. If the movement has not yet been completed, the process returns to step 606, whereas if the movement has been completed, the process returns to the main routine. That the movement to the gripping position has been completed at this point of time reveals the presence of such an abnormality that the workpiece to be held has not yet been set. In this case, an error signal or the like may be output. In this process, however, an error signal is not output by taking idle machining into consideration. Even if an error signal is not output, it is possible to recognize that normal gripping has not been effected because a gripping signal (described later) is not output.

If the driving torque of the spindle motor 4 has reached the torque limiting value T2 at step 606, it means that the system is in a normal state. Therefore, the process proceeds to step 608. At step 608, the true present position of the gripping jaws 30 on the C-axis is calculated. The true present position is obtained by subtracting the C-axis servo delay quantity from the present C-axis coordinate value. Next, the process proceeds to step 609 at which the nearest clutch engagement position to the true present position is calculated. Clutch engagement positions are where the clutch teeth 116 and 117 are engageable. Next, the process proceeds to step 610 at which the gripping jaws 30 start to move to the nearest clutch engagement position at ultra-low speed V3 and with no limitation on torque.

At step 611, the process waits until the movement of the gripping jaws 30 is completed. Upon completion of the movement, the process proceeds to step 612 at which a judgement is made as to whether or not the stop position is within a permissible error (error detection level). If the stop position is within the permissible error, a gripping signal confirming that the gripping has been normally completed is output at step 613. Then, the process returns to the main routine. If the stop position is not within the permissible error, a gripping error signal indicating a gripping diameter abnormality is output at step 614, and then the process returns to the main routine.

Thus, when the driving torque of the spindle motor 4 has reached the torque limiting value T2 and the gripping jaws 30 have stopped at a position within the permissible error from the set gripping position, a gripping signal confirming the normal gripping is output. Therefore, the gripping operation improves in reliability. For example, if gripping confirmation is made by only the position of the gripping jaws as in the conventional practice, it is impossible to detect the gripping jaws 30 having failed to grip a workpiece. Moreover, if gripping confirmation is made by only the driving torque, it is impossible to detect the mistake of setting a wrong workpiece, which is different in type from the desired one. By making gripping confirmation on the basis of both the driving torque and the gripping jaw position, it becomes possible to output a gripping signal of high reliability for confirming the gripping operation.

If control is effected such that the rotation of the main spindle is allowed when the gripping signal is detected, safety in the operation of the machine tool improves. The system is preferably arranged such that the operator can selectively switch between a mode in which the rotation of the main spindle is allowed when the gripping signal is detected and a mode in which the rotation of the main spindle is allowed regardless of whether or not the gripping signal is detected. It is preferable to enable the operator to switch between the two modes from the NC machining program.

By virtue of the above-described control, the gripping jaws 30 move at high speed at a position away from the gripping position. In the vicinity of the gripping position, the gripping jaws 30 move at low speed to surely grip the workpiece. Moreover, it is possible to grip the workpiece with the set gripping force. Thus, it is possible to effect optimum gripping according to the rigidity of the workpiece within a short period of time. Further, because confirmation of the normal gripping of the workpiece is made by both the driving torque (gripping force) of the spindle motor 4 and the position of the gripping jaws 30, the reliability and safety of the machine tool improve.

Although in this embodiment the movement of the gripping jaws 30 from the stop position to a clutch engagement position is made with respect to the nearest clutch engagement position, the destination of the gripping jaw movement may be changed according to the set gripping force. That is, the movement of the gripping jaws 30 may be controlled as follows. When the gripping force is near the maximum torque, the gripping jaws 30 are moved to a clutch engagement position located in the direction in which the gripping jaws 30 are untightened. When the gripping force is near the minimum torque, the gripping jaws 30 are moved to a clutch engagement position located in the direction in which the gripping jaws 30 are tightened. At an intermediate torque, the gripping jaws 30 are moved to the nearest clutch engagement position to the present position.

Figure 9:
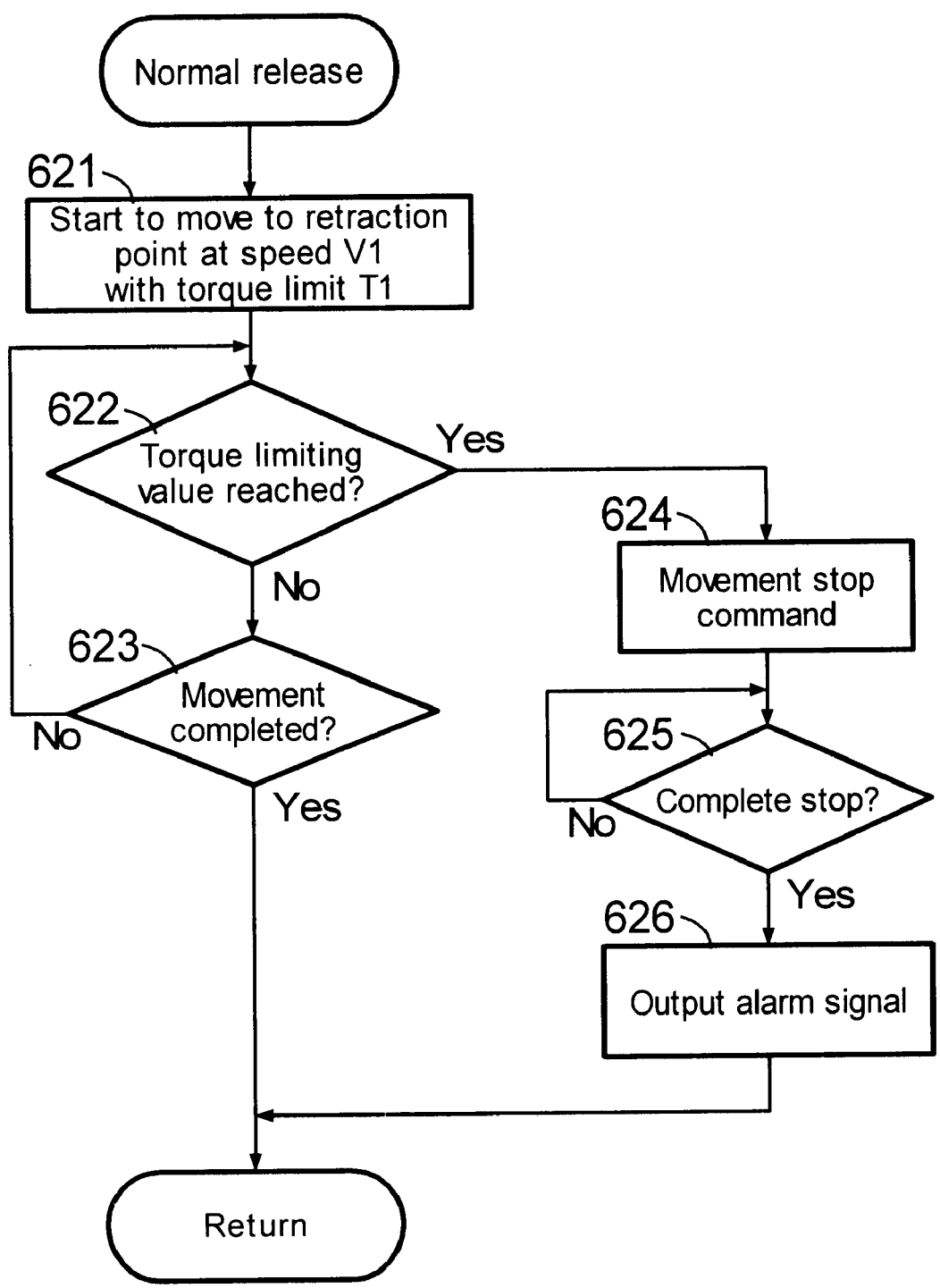
FIG. 9 is a flowchart showing the control of a normal release operation of the chuck.

FIG. 9 is a flowchart showing release control in the normal open-close operation of the chuck 15. The flowchart shows processing for effecting control as shown in part (c) of FIG. 6. The program for executing the illustrated processing is contained in the chuck control program 541 and called from the main routine of the chuck control program 541. When a normal release operation is initiated, the gripping jaws 30 start to move from the grip point to the retraction point at high speed V1 and with torque limiting value T1 at step 621.

At the subsequent step 622, it is judged whether or not the driving torque of the spindle motor 4 has reached the torque limiting value T1. If the torque limiting value T1 has been reached, the process proceeds to step 624. That the torque limiting value T1 has been reached at this point of time means that the chuck 15 is in an abnormal condition, e.g. clogging with chips. At step 624, a movement stop command is delivered to the C-axis/spindle control unit 410 to stop the gripping jaws 30 on account of abnormality. At step 625, the process waits until the gripping jaws 30 come to a complete stop. After the gripping jaws 30 have come to a complete stop, an alarm signal is output at step 626, and then the process returns to the main routine. If it is judged at step 622 that the torque limiting value T1 has not yet been reached, a judgment is made at step 623 as to whether or not the movement to the retraction point has been completed. If the movement has not yet been completed, the process returns to step 622, whereas if the movement has been completed, the process returns to the main routine.

Figure 10:
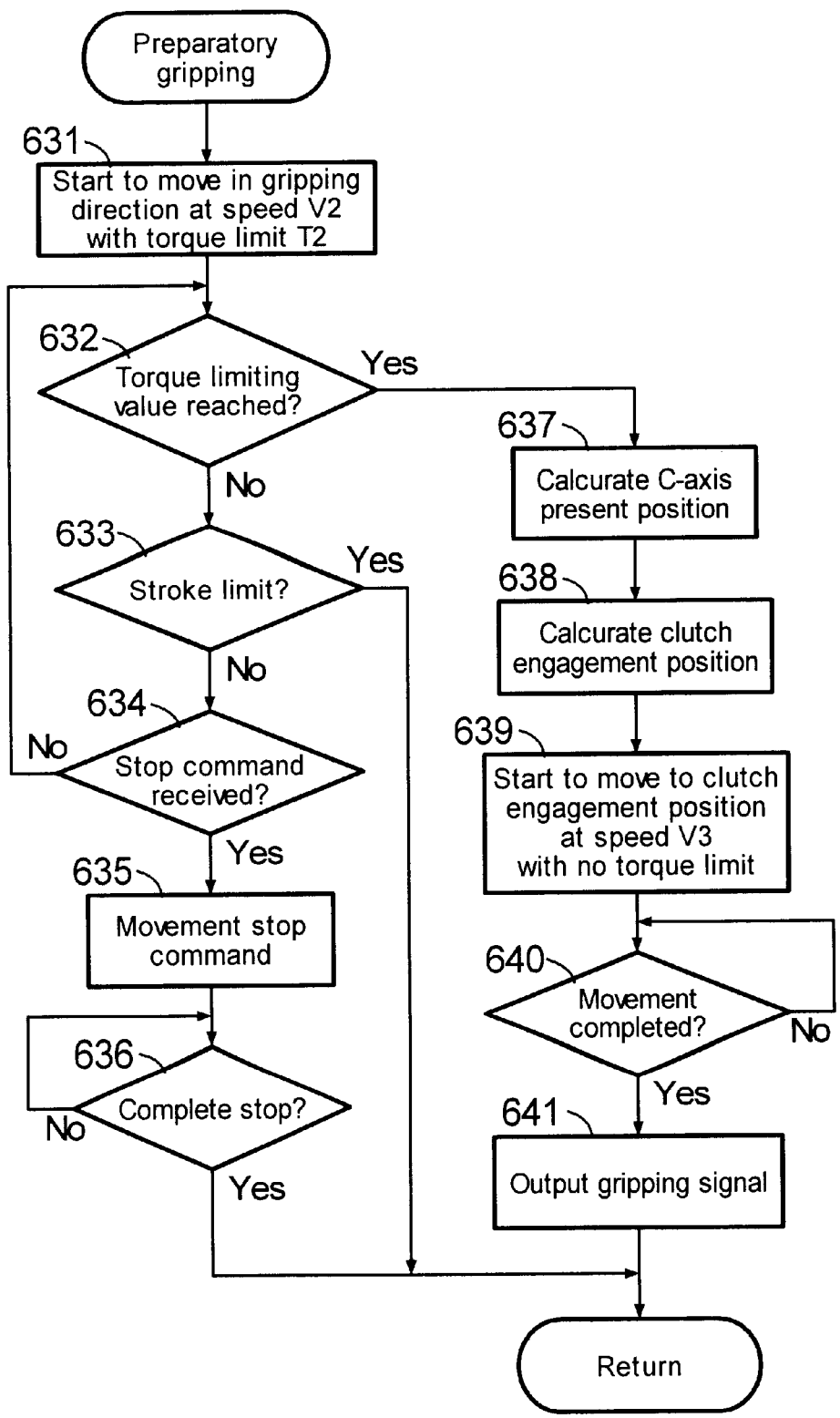
FIG. 10 is a flowchart showing the control of a preparatory gripping operation of the chuck.

FIG. 10 is a flowchart showing gripping control in the preparatory open-close mode of the chuck 15. The flowchart shows processing for effecting control as shown in parts (a) and (c) of FIG. 7. The program for executing the illustrated processing is contained in the chuck control program 541 and called from the main routine of the chuck control program 541. When a preparatory gripping operation is initiated, the gripping jaws 30 start to move from the present position in the gripping direction at low speed V2 and with torque limiting value T2 at step 631. In the case of external clamping, the gripping direction is the direction in which the gripping jaws 30 move toward the stroke lower limit. In the case of internal clamping, the gripping direction is the direction in which the gripping jaws 30 move toward the stroke upper limit.

At the subsequent step 632, it is judged whether or not the driving torque of the spindle motor 4 has reached the torque limiting value T2. If the torque limiting value T2 has not yet been reached, the process proceeds to step 633 at which a judgment is made as to whether or not the stroke limit has been reached. If the stroke limit has not yet been reached, the process proceeds to step 634, whereas if the stroke limit has been reached, the process returns to the main routine. The reason why the movement is completed at this point of time is to prevent occurrence of such a problem that the expected gripping force cannot be obtained with respect to the driving torque because of disengagement or insufficient engagement of the scroll teeth 28 of the master jaws 26 and the scroll groove 19 of the scroll 96.

At step 634, it is judged whether or not a stop command from the operator has been received, that is, whether or not the operator has released the foot switch 501. If no stop command has been received, the process returns to step 632, whereas if a stop command has been received, the process proceeds to step 635 at which a movement stop command is delivered to the C-axis/spindle control unit 410 to stop the gripping jaws 30. This stop position may be set without taking into consideration the engagement of the clutch teeth. In such a case, however, the gripping jaws 30 need to be moved to a position determined by taking into consideration the engagement of the clutch teeth before the locking pin 45 is pulled out from the positioning hole 41. At step 636, the process waits until the gripping jaws 30 come to a complete stop. After the gripping jaws 30 have come to a complete stop, the process returns to the main routine.

If the driving torque of the spindle motor 4 has reached the torque limiting value T2 at step 632, it means that the gripping jaws 30 have gripped the workpiece. Therefore, the process proceeds to step 637. At step 637, the true present position of the gripping jaws 30 on the C-axis is calculated. Then, the process proceeds to step 638 at which the nearest clutch engagement position to the true present position is calculated. Then, the process proceeds to step 639 at which the gripping jaws 30 start to move to the nearest clutch engagement position at ultra-low speed V3 and with no limitation on torque. At step 640, the process waits until the movement of the gripping jaws 30 is completed. Upon completion of the movement, a gripping signal indicating that gripping has been normally completed is output at step 641. Then, the process returns to the main routine.

Figure 11:
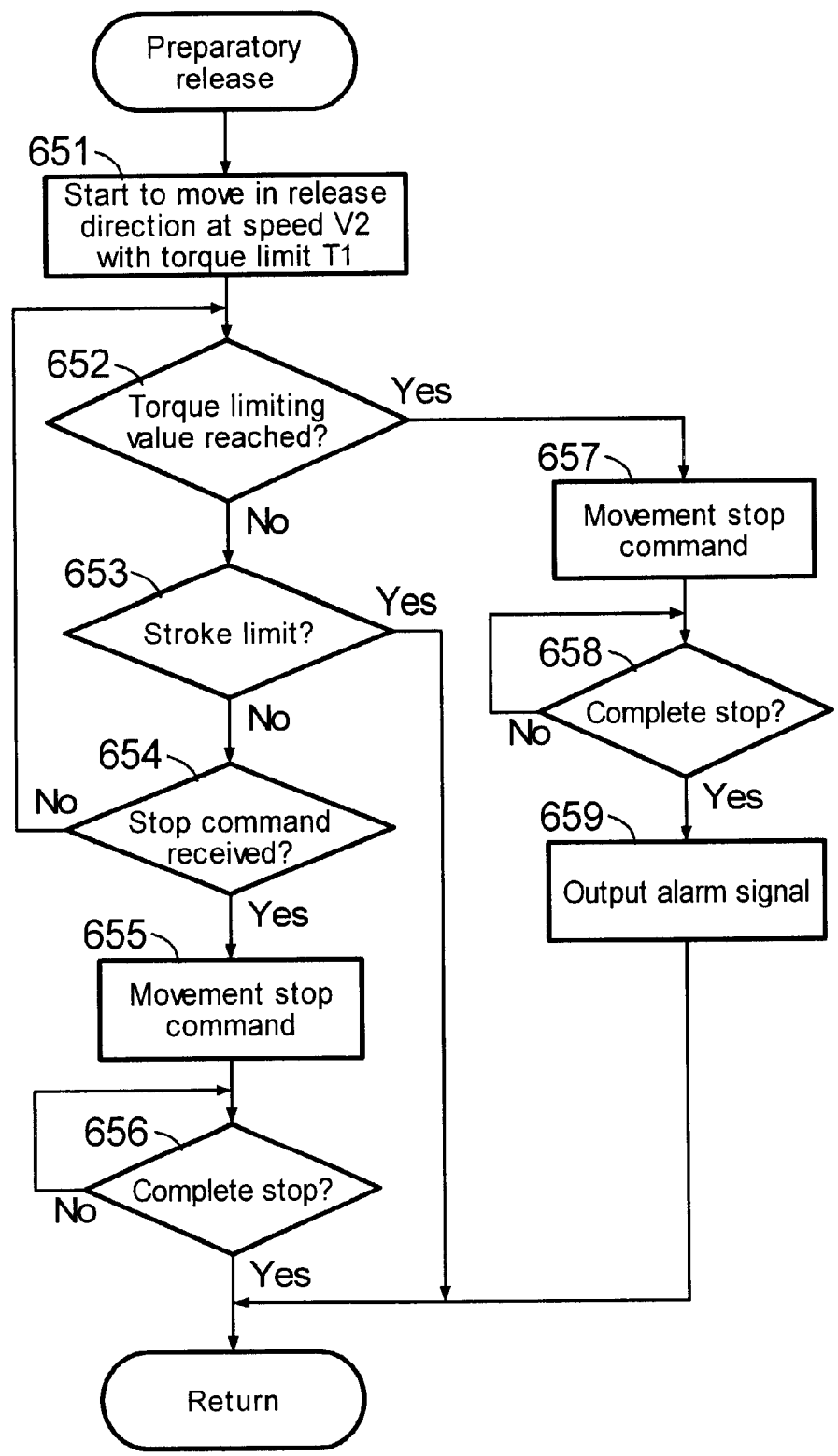
FIG. 11 is a flowchart showing the control of a preparatory release operation of the chuck.

FIG. 11 is a flowchart showing release control in the preparatory open-close mode of the chuck 15. The program for executing this processing is contained in the chuck control program 541 and called from the main routine of the chuck control program 541. The preparatory release operation is an operation of releasing a workpiece in the preparatory open-close mode. When the preparatory release operation is initiated, the gripping jaws 30 start to move from the present position in the release direction at low speed V2 and with torque limiting value T1 at step 651. In the case of external clamping, the release direction is the direction in which the gripping jaws 30 move toward the stroke upper limit. In the case of internal clamping, the release direction is the direction in which the gripping jaws 30 move toward the stroke lower limit.

At the subsequent step 652, it is judged whether or not the driving torque of the spindle motor 4 has reached the torque limiting value Ti. If the torque limiting value T1 has been reached, the process proceeds to step 657. That the torque limiting value T1 has been reached at this point of time means that the chuck 15 is in an abnormal condition, e.g. clogging with chips. At step 657, a movement stop command is delivered to the C-axis/spindle control unit 410 to stop the gripping jaws 30 on account of abnormality. At step 658, the process waits until the gripping jaws 30 come to a complete stop. After the gripping jaws 30 have come to a complete stop, an alarm signal is output at step 659, and then the process returns to the main routine.

If it is judged at step 652 that the torque limiting value T1 has not yet been reached, a judgment is made at step 653 as to whether or not the stroke limit has been reached. If the stroke limit has not yet been reached, the process proceeds to step 654, whereas if the stroke limit has been reached, the process returns to the main routine. At step 654, it is judged whether or not a stop command from the operator has been received. If no stop command has been received, the process returns to step 652, whereas if a stop command has been received, the process proceeds to step 655 at which a movement stop command is delivered to the C-axis/spindle control unit 410 to stop the gripping jaws 30. At step 656, the process waits until the gripping jaws 30 come to a complete stop. After the gripping jaws 30 have come to a complete stop, the process returns to the main routine. Thus, in the preparatory open-close mode, the operator performs an open-close operation. Therefore, for the sake of safety, the gripping jaws 30 are moved at low speed V2, and travel at high speed V1 is not performed.

The set value selecting/changing program 544 executes processing for selecting or changing chucking data at the time of executing a predetermined command programmed into the NC machining program. When a command for selecting a group of chucking data (e.g. "G10 L130 Pnn") is received, the nn-th group of chucking data stored in the chucking data memory 57 is selected. When a command for changing chucking data in a given group of chucking data (e.g. "G10 L131 Pnn Qmm Rdd") is received, the mm-th chucking data in the nn-th group of chucking data is changed to dd and the changed chucking data is stored.

The following is a detailed description of the selection of a group of chucking data (parameter group No.) from the NC machining program and the change of data, e.g. gripping force, with reference to FIGS. 12 and 13. Selection of a group of chucking data from the NC machining program is made by using a command as shown in part (a) of FIG. 12. In the command, "nn" of "Pnn" is No. of a group of chucking data.

The selection of a chucking data group will be described below in detail by way of examples of programs shown in part (b) of FIG. 12. In part (b) of FIG. 12, the left-hand side of the dotted line shows programs, and the right-hand side of the dotted line shows comments. In a program (O2000) for a workpiece A, a chucking data group No. 10 is selected. Accordingly, a group of chucking data, e.g. a gripping force of 5000 kgf and a gripping diameter of 100.0 mm, are specified. When a chuck clamp command (e.g. M68) is executed, the workpiece A is gripped according to the chucking data. Part (c) of FIG. 12 shows the contents of each data in the chucking data group of parameter group No. 10.

In a program (O2200) for a workpiece B, a chucking data group No. 12 is selected. Therefore, a group of chucking data, e.g. a gripping force of 1000 kgf and a gripping diameter of 82.0 mm, are specified. When a chuck clamp command (e.g. M68) is executed, the workpiece B is gripped according to the chucking data. Part (d) of FIG. 12 shows the contents of each data in the chucking data group of parameter group No. 12.

By selecting such groups of chucking data, optimum conditions for gripping the workpiece can be selected when the same workpiece is to be subjected continuously to primary machining (face machining) and secondary machining (back machining). To carry out rough cutting and finishing, it is also possible to hold the workpiece under optimum gripping conditions by selecting an optimum chucking data group for each of the machining operations. That is, during rough cutting, the workpiece can be held with strong gripping force, and during finishing, the workpiece can be held with appropriate gripping force that will not deform the workpiece.

Change of chucking data from the NC machining program is made by using a command as shown in part (a) of FIG. 13. In the command: "nn" of "Pnn" is No. of a group of chucking data; "mm" of "Qmm" is No. of data; "dd" of "Rdd" is data after the data change. Regarding the data No. "mm": "1" represents gripping force; "2" represents gripping diameter; "3" represents speed change point; "4" represents retraction point; and "5" represents error detection level. Each data item can be changed by specifying the corresponding data No. Part (c) of FIG. 13 shows the relationship between the data No. and the items of data.

The change of chucking data will be further described with reference to part (b) of FIG. 13. "G10 L131 P10 Q1 R2000.;" is a command for changing the data concerning gripping force in the chucking data group No. 10 to 2000 kgf. The subsequent command is a command for changing the data concerning retraction point in the same chucking data group No. 10 to 108 mm. Thus, it is possible to use chucking data while changing them sequentially. That is, if at least one group of chucking data is provided in the chucking data memory 57, the chuck 15 can hold all types of workpieces.

Thus, it is possible to control a chuck capable of moving the gripping jaws over a wide range while selecting and changing chucking data by an NC machining program. Therefore, it is possible to machine a plurality of different types of workpieces continuously. It is also possible to perform continuous machining by an unattended operation of a machine tool. Accordingly, it is possible to achieve productivity improvements and automation.

As has been stated above, in a motor-driven chucking device having a large travel stroke of gripping jaws and applicable to a wide range of workpieces, the speed of the gripping jaws is controlled so as to change between high speed and low speed according to the position of the gripping jaws. Therefore, the gripping time can be shortened despite the large stroke. In a motor-driven chucking device in which a chuck is driven to open or close by a spindle motor, the high-speed movement of the gripping jaws and the low-speed movement thereof can be performed by C-axis rapid traverse and machining feed. Accordingly, the control can be simplified. Furthermore, because the gripping operation initiating position (retraction point) of the gripping jaws and the gripping diameter can be set at any desired values, even in a motor-driven chucking device in which the full travel stroke of the gripping jaws is large and which is capable of holding workpieces of diameters varying over a wide range, the travel stroke in the actual gripping operation can be set at a minimum required quantity. Thus, the time required for gripping and releasing operations can be shortened.

It is also possible to output an error signal when the diameter of the workpiece is not within a permissible error and to output a gripping signal for confirming the gripping of the workpiece from a combination of the driving torque of the driving motor and the gripping jaw position. In addition, other alarm signals can be output by combining together the driving torque of the driving motor and the gripping jaw position. Thus, the chucking operation improves in reliability and safety.

Although in the above-described embodiment the gripping jaws are driven to open or close by the spindle motor, it should be noted that the gripping jaws may be driven by a special-purpose motor provided separately from the spindle motor. Although in the foregoing embodiment the chuck is provided on a rotatable main spindle, the chuck may be provided on a frame, e.g. a table, of a machine tool such as a machining center, or on a mounting member provided on such a frame. In the foregoing embodiment, the jaw position calculating device is implemented by the jaw position calculating program 542, and the gripping force calculating device by the gripping force calculating program 543, and further the set value selecting/changing device by the set value selecting/changing program 544. However, these devices may be implemented by hardware such as an electronic circuit.

The present invention is arranged as stated above and provides the following advantageous effects.

According to the present invention, a set value for workpiece gripping force can be input and the opening and closing operation of the gripping jaws is controlled by the driving motor according to the set value for gripping force. Therefore, the workpiece can be held with an appropriate gripping force, which is set according to the type of workpiece. Accordingly, there is no likelihood that the workpiece will be deformed by excessively strong gripping force, or that the workpiece will fall from the chuck because of excessively weak gripping force.

Because the gripping force and the torque of the driving motor are converted to each other, the gripping force of the chuck itself can be displayed to the operator. This enables the operator to set a gripping force easily and reduces the incidence of setting errors.

Because a set value for the workpiece gripping diameter can be input and the opening and closing operation of the gripping jaws is controlled by the driving motor according to the set value for the gripping diameter, it is possible to output an error signal when the diameter of the workpiece is not within a permissible error. Accordingly, safety in the chucking operation can be improved. In addition, because the gripping jaw position can controlled, other alarm signals can be output by combining together the gripping jaw position and the driving torque of the driving motor. Thus, safety in the chucking operation can be improved.

Because the movement of the gripping jaws is stopped when it is judged that the driving torque of the driving motor has reached the set value, the chuck and the workpiece can be prevented from being damaged by excessively strong gripping force which might otherwise be produced.

A gripping signal confirming the gripping of the workpiece is output when the driving torque of the driving motor has reached the set value and the gripping jaws have stopped at a position within a predetermined range from the gripping diameter. Therefore, the gripping operation and the gripping confirmation improve in reliability. Thus, it is possible to detect the gripping jaws having failed to grip a workpiece, and it is also possible to detect the mistake of setting a wrong workpiece, which is different in type from the desired one.

Because it is possible to set a gripping operation initiating position of the gripping jaws and a gripping diameter, which is a gripping operation terminating position, even if the full travel stroke of the gripping jaws is large, the travel stroke in the actual gripping operation can be set at a minimum required quantity. Thus, the time required for gripping and releasing operations can be shortened.

Because the travel speed of the gripping jaws is controlled so as to change between high speed and low speed according to the position of the gripping jaws, the gripping time can be shortened, and reliable gripping can be effected.

Because a gripping diameter is input by gripping a workpiece whose gripping diameter is known to teach the controller the gripping diameter, gripping jaw position data in the controller and the actual gripping jaw position can be made coincident with each other easily, and it is possible to effect accurate position control of the gripping jaws.

Because the position of the gripping jaws and the rotational position of the driving motor are converted to each other, the gripping jaw position can be displayed to the operator in the form of a diameter value. This allows the operator to readily appreciate the gripping jaw position and reduces the incidence of setting errors.

Because the gripping jaws are driven to open or close by the spindle motor, the gripping jaw driving mechanism can be simplified, and it is unnecessary to increase the number of driving motors. Accordingly, the cost of the machine tool can be reduced. Furthermore, the high-speed movement of the gripping jaws and the low-speed movement thereof can be performed by C-axis rapid traverse and machining feed. Therefore, the control can be simplified.

Because chucking data can be selected and changed from an NC machining program, the machine tool is improved in automatic operation function and can be automated to perform an unattended operation.

It should be noted that the present invention is not necessarily limited to the foregoing embodiment but can be modified in a variety of ways without departing from the gist of the present invention.

What is claimed is:

1. A method of controlling a motor-driven chucking device in which gripping jaws of a chuck provided on a main spindle rotatably supported by a frame provided on a body of a machine tool are opened or closed by a torque controllable driving motor to grip a workpiece, said method comprising the steps of:

inputting a set value for gripping force, with which said gripping jaws grip the workpiece, by a command from an NC machining program;

providing a correspondence between values of a driving torque of said driving motor and values of a gripping force of said chuck;

opening or closing said gripping jaws by controlling rotation of an output shaft of said driving motor according to the set value for said gripping force; and stopping movement of said gripping jaws when said driving torque of said driving motor has reached a value corresponding to the set value for said gripping force.

2. A method of controlling a motor-driven chucking device in which gripping jaws of a chuck supported by a frame provided on a body of a machine tool are opened or closed by a torque and a position controllable driving motor to grip a workpiece, said method comprising the steps of:

inputting a set value for gripping force with which said gripping jaws grip the workpiece;

inputting a set value for a gripping diameter of the workpiece which is a gripped portion dimension of a workpiece;

providing a correspondence between values of a driving torque of said driving motor and values of a gripping force of said chuck;

providing a correspondence between values of a rotational position of said driving motor and values of a position of said gripping jaws;

controlling the gripping force and position of said gripping jaws by controlling the rotation of an output shaft of said driving motor according to the set value for said gripping force and the set value for said gripping diameter; and outputting a gripping signal confirming that said workpiece has been gripped when said driving torque of said driving motor has reached a value corresponding to the set value for said gripping force and said gripping jaws have stopped at a position within a predetermined range from the set value for said gripping diameter.

3. A method according to claim 2, wherein inputting at least one of the set value for said gripping force and the set value for said gripping diameter is executed by a command from an NC machining program.

4. A method according to claim 2, further comprising the steps of:

inputting a gripping operation initiating position of said gripping jaws; and moving said gripping jaws to open or close between said gripping operation initiating position and the set value for said gripping diameter by controlling rotation of an output shaft of said driving motor.

5. A method according to claim 4, wherein inputting at least one of said gripping operation initiating position and the set value for said gripping diameter is executed by a command from an NC machining program.

6. A method of controlling a motor-driven chucking device in which gripping jaws of a chuck supported by a frame provided on a body of a machine tool are opened or closed by a position and speed controllable driving motor to grip a workpiece, said method comprising the steps of:

inputting a set value for a speed change position at which a travel speed of said gripping jaws is to be changed;

moving said gripping jaws from a gripping operation initiating position to a speed change position at a first speed; and changing the travel speed of said gripping jaws to a second speed, which is lower than said first speed, when the position of said gripping jaws has exceeded the set value for said speed change position in a direction for gripping said workpiece.

7. A method according to claim 6, wherein inputting the set value for said speed change position is executed by a command from an NC machining program.

8. A method of controlling a motor-driven chucking device in which gripping jaws of a chuck supported by a frame provided on a body of a machine tool are opened or closed by a position controllable driving motor to grip a workpiece, said method comprising the steps of:

inputting a gripped portion dimension of a workpiece having a known gripped portion dimension;

gripping said workpiece, whose gripped portion dimension has been input, with gripping portions of said gripping jaws of said chuck;

inputting a teaching command when said workpiece is being gripped by said chuck; and calibrating present diametrical position data of said gripping jaws to coincide with position data corresponding to said gripped portion dimension when said teaching command is input.

9. A method according to any one of claims 1 to 8, wherein said chuck is provided on a main spindle rotatably supported by a headstock of the machine tool, wherein said chuck consists of a main body part of said chuck, gripping jaws and a moving mechanism for opening or closing said gripping jaws by rotating said main spindle relative to said main body part, and wherein said driving motor rotates and positions said main spindle about an axis of said main spindle, said method further comprising the steps of:

bringing said main body part of said chuck into locked state in which said main body part of said chuck is unable to rotate relative to the body of said machine tool; and opening or closing said gripping jaws by controlling said driving motor while keeping said main body part in said locked state.

10. A method of controlling a motor-driven chucking device in which gripping jaws of a chuck provided on a main spindle rotatably supported by a headstock of a machine tool are opened or closed by a position controllable driving motor to grip a workpiece, wherein said chuck consists of a main body part of said chuck, gripping jaws and a moving mechanism for opening or closing said gripping jaws by rotating said main spindle relative to said main body part, and wherein said driving motor rotates and positions said main spindle about an axis of said main spindle;

said method comprising the steps of:

inputting a set value for a gripping diameter of the workpiece;

bringing a main body part of said chuck into a locked state in which said main body part of said chuck is unable to rotate relative to a body of said machine tool; and opening or closing said gripping jaws to grip said workpiece by controlling rotation of an output shaft of said driving motor according to the set value for said gripping diameter while keeping said main body part in said locked state.

11. An apparatus for controlling a motor-driven chucking device in which gripping jaws of a chuck provided on a main spindle rotatably supported by a frame provided on a body of a machine tool are opened or closed to grip a workpiece, said apparatus comprising:

a driving motor for opening or closing said gripping jaws of said chuck, said driving motor being controllable a driving torque;

a storage for storing the set value for said gripping force with which said gripping jaws grip the workpiece;

an input device for inputting a set value for said gripping force by a command from an NC machining program;

means for providing a correspondence between values of a driving torque of said driving motor and values of a gripping force of said chuck; and a controller for controlling rotation of an output shaft of said driving motor according to the set value for said gripping force so as to open or close said gripping jaws, said controller stopping movement of said gripping jaws when said gripping force has reached the set value for said gripping force.

12. An apparatus for controlling a motor-driven chucking device in which gripping jaws of a chuck supported by a frame provided on a body of a machine tool are opened or closed to grip a workpiece, said apparatus comprising:

a driving motor for opening or closing said gripping jaws of said chuck, said driving motor being controllable a driving torque and an angular position of rotation;

an input device for inputting a set value for gripping force with which said gripping jaws grip the workpiece and a set value for a gripping diameter of the workpiece which is a gripped portion dimension of a workpiece;

means for providing a correspondence between values of a driving torque of said driving motor and values of a gripping force of said chuck;

means for providing a correspondence between values of a rotational position of said driving motor and values of a position of said gripping jaws; and a controller for controlling rotation of an output shaft of said driving motor according to the set value for said gripping force and the set value for said gripping diameter, said controller outputs a gripping signal confirming that said workpiece has been gripped when a driving torque of said driving motor has reached the value of a driving torque corresponding to the set value for said gripping force and said gripping jaws have stopped at a position within a predetermined range from the set value for said gripping diameter.

13. An apparatus according to claim 12, wherein said input device is capable of inputting at least one of the set value for said gripping force and the set value for said gripping diameter by a command from an NC machining program, said apparatus further comprising:
a storage for storing the set value for said gripping force and the set value for said gripping diameter.

14. An apparatus according to claim 12, wherein said input device allows entry of a set value for a gripping diameter of said workpiece and a gripping operation initiating position of said gripping jaws, and said controller controls rotation of said driving motor so as to open or close said gripping jaws between said gripping operation initiating position and the set value for said gripping diameter.

15. An apparatus according to claim 14, wherein said input device is capable of inputting at least one of the set value for said gripping diameter and said gripping operation initiating position by a command from an NC machining program, said apparatus further comprising:
a storage for storing the set value for said gripping diameter and said gripping operation initiating position.

16. An apparatus for controlling a motor-driven chucking device in which gripping jaws of a chuck supported by a frame provided on a body of a machine tool are opened or closed to grip a workpiece, said apparatus comprising:

a driving motor for opening or closing said gripping jaws of said chuck, said driving motor being controllable an angular position and speed of rotation;

an input device for inputting a set value for a speed change position at which the travel speed of said gripping jaws is to be changed; and a controller for controlling rotation of said driving motor so as to move said gripping jaws from a gripping operation initiating position to a speed change position at a first speed, and change the travel speed of said gripping jaws to a second speed, which is lower than said first speed, when the position of said gripping jaws has exceeded the set value for said speed change position during movement of said gripping jaws in a direction for gripping said workpiece.

17. An apparatus according to claim 16, wherein said input device is capable of inputting the set value for said speed change position by a command from an NC machining program, said apparatus further comprising:
a storage for storing the set value for said speed change position.

18. An apparatus for controlling a motor-driven chucking device in which gripping jaws of a chuck supported by a frame provided on a body of a machine tool are opened or closed to grip a workpiece, said apparatus comprising:

a driving motor for opening or closing said gripping jaws of said chuck, said driving motor being controllable an angular position of rotation;

an input device for inputting a gripped portion dimension of a workpiece having a known gripped portion dimension, said input device allows input of a teaching command; and a controller for effecting control such that said workpiece whose gripped portion dimension has been input is gripped with gripping portions of said gripping jaws of said chuck, and present diametrical position data concerning said gripping portions is calibrated to coincide with position data corresponding to said gripped portion dimension when said teaching command is input from said input device.

19. An apparatus according to anyone of claims 11 to 18, wherein said chuck is provided on a main spindle rotatably supported by a headstock of the machine tool, wherein said chuck consists of a main body part of said chuck, gripping jaws and a moving mechanism for opening or closing said gripping jaws by rotating said main spindle relative to said main body part, and wherein said driving motor rotates and positions said main spindle about an axis of said main spindle, said apparatus further comprising:

a switching mechanism for switching between a locked state in which said main body part of said chuck is unable to rotate relative to the body of said machine tool and an unlocked state in which said main body part is rotatable relative to the body of said machine tool, wherein said controller controls said switching mechanism so as to bring said main body part into said locked state, and then controls said driving motor to perform an open-close operation of said gripping jaws.

20. An apparatus for controlling a motor-driven chucking device in which gripping jaws of a chuck provided on a main spindle rotatably supported by a headstock of a machine tool are opened or closed to grip a workpiece, wherein said chuck consists of a main body part of said chuck, gripping jaws and a moving mechanism for opening or closing said gripping jaws by rotating said main spindle relative to said main body part, said apparatus comprising:

a position controllable driving motor for rotating and positioning said main spindle about an axis of said main spindle and for opening or closing said gripping jaws of said chuck;

a switching mechanism for switching between a locked state in which said main body part of said chuck is unable to rotate relative to a body of said machine tool and an unlocked state in which said main body part is rotatable relative to the body of said machine tool;

an input device for inputting a set value for a gripping diameter of the workpiece; and a controller for controlling said switching mechanism so as to bring said main body part into said locked state and for controlling rotation of an output shaft of said driving motor according to the set value for said gripping diameter to open or close said gripping jaws.

* * * * *